United States Patent
Ulinich et al.

(10) Patent No.: US 12,045,742 B1
(45) Date of Patent: Jul. 23, 2024

(54) SHARING PROBABILITIES FOR USER TRAITS

(71) Applicants: Mikhail Ulinich, Mountain View, CA (US); Edward Remco Strong, San Diego, CA (US); Calvin Fan, San Diego, CA (US)

(72) Inventors: Mikhail Ulinich, Mountain View, CA (US); Edward Remco Strong, San Diego, CA (US); Calvin Fan, San Diego, CA (US)

( * ) Notice: Subject to any disclaimer, the term of this patent is extended or adjusted under 35 U.S.C. 154(b) by 1333 days.

(21) Appl. No.: 15/132,192

(22) Filed: Apr. 18, 2016

Related U.S. Application Data

(60) Provisional application No. 62/297,125, filed on Feb. 18, 2016, provisional application No. 62/149,524, filed on Apr. 18, 2015.

(51) Int. Cl.
*G06N 7/01* (2023.01)
*G06Q 50/00* (2024.01)

(52) U.S. Cl.
CPC .............. *G06N 7/01* (2023.01); *G06Q 50/01* (2013.01)

(58) Field of Classification Search
CPC ................................ G06N 7/005; G06Q 50/01
See application file for complete search history.

(56) References Cited

U.S. PATENT DOCUMENTS

| | | | |
|---|---|---|---|
| 6,545,682 B1 | 4/2003 | Ventrella et al. | |
| 7,806,758 B2 | 10/2010 | Van Luchene | |
| 8,386,519 B2 * | 2/2013 | Kenedy | G06F 16/951 |
| | | | 707/784 |
| 8,438,042 B2 | 5/2013 | Ledley | |
| 8,483,966 B1 | 7/2013 | Ledley | |
| 8,543,339 B2 | 9/2013 | Wojcicki et al. | |
| 8,620,594 B2 * | 12/2013 | Silver | C12Q 1/6827 |
| | | | 702/20 |
| 9,111,144 B2 | 8/2015 | Fogg et al. | |
| 10,658,068 B2 * | 5/2020 | Delaney | G16B 20/40 |
| 2007/0073557 A1 * | 3/2007 | Abramson | G06Q 20/327 |
| | | | 705/2 |
| 2008/0004848 A1 * | 1/2008 | Avey | G16B 20/20 |
| | | | 435/6.12 |
| 2010/0216655 A1 | 8/2010 | Sulem | |
| 2011/0104669 A1 | 5/2011 | Kayser et al. | |
| 2011/0312534 A1 | 12/2011 | Kayser et al. | |
| 2012/0329561 A1 * | 12/2012 | Evans | A63F 13/79 |
| | | | 463/43 |
| 2014/0108527 A1 * | 4/2014 | Aravanis | G06Q 50/01 |
| | | | 709/204 |
| 2014/0348403 A1 * | 11/2014 | Kurtz | G16H 40/67 |
| | | | 382/128 |
| 2016/0239891 A1 * | 8/2016 | Braghetto Neto | G06Q 30/0201 |

OTHER PUBLICATIONS

Screenshot from ALFRED, the ALlele FREquency Database, SNP UID SI001630K, downloaded Mar. 29, 2015.
Screenshots from Biostars forum, "Question: Estimating Probability Of Differeing Allele Frequencies From Pooled Samples", downloaded Mar. 15, 2015.

(Continued)

*Primary Examiner* — Benjamin P Geib

(57) ABSTRACT

Educational applications for sharing information and probabilities about the genetic traits of users.

30 Claims, 18 Drawing Sheets

(56) References Cited

OTHER PUBLICATIONS

Screenshots from Boundless, "Probability Basics", downloaded Mar. 15, 2015.
Duforet-Freboug, Manual of HaploPOP, Feb. 18, 2015 (CNRS).
"DNA at the Gym", GenomeWeb, Apr. 15, 2016.
"Probabilities of Genetic Traits", Lawrence Livermore Nat. Lab. website, downloaded Mar. 15, 2015.
"Blood Type Forecast" app by Maxwell Software on iTunes, downloaded Apr. 28, 2015.
Nakano et al., "A strong association of axillary osmidrosis with the wet earwax type," BMC Genetics, Aug. 4, 2009.
"Tag Archives: online game Butterfly wing pattern evolution", May 27, 2014.
Pathway Genomics app by Pathway Genomics Corp. on iTunes, downloaded Apr. 28, 2015.
Pereira, "Study says those who enjoy bitter tastes (like IPAs) more likely to be antisocial, sadistic" SFGate, Mar. 11, 2016.
Baby Eye Color Predictor by Sun Teame Pte. Ltd. on iTunes App Store, posted Apr. 2, 2015.
"For $999, Veritas Genetics Will Put Your Genome on a Smartphone App", Technology Review, downloaded Apr. 16, 2016.
Univ. of Michigan, presentation "Genes for Good" ASGH 2014.
Univ. Utah, "Independent Assortment & Probability" downloaded Mar. 15, 2016.

\* cited by examiner

Figure 6A: Hair traits

| trait | region, genes or loci | repr. SNP allele | study pop. |
|---|---|---|---|
| Red vs non-red | MC1R | rs1805007-T | individuals |
| Red vs. non-red | ASIP; RPS2P1 - ASIP | rs1015362-G, rs4911414-T | individuals |
| Black vs. blond color | IRF4 | rs12203592-T | European |
| Black vs. blond color | MATP; SLC45A2 | rs28777-C | European |
| Black vs. blond color | EXOC2 | rs6918152-A | European |
| Black vs. blond color | HERC2 | rs12913832-A | European |
| Black vs. blond color | intergenic; 15q13.1; WHAMMP2 - LOC100289656 | rs8033165-T | European |
| Black vs. blond color | SLC24A4; LOC105370627 | rs12896399-G | European |
| Black vs. blond color | OCA2 | rs11855019-G | European |
| Black vs. blond color | IRF4 | rs12203592-T | European |
| Black vs. blond color | MATP; SLC45A2 | rs28777-C | European |
| Black vs. blond color | EXOC2 | rs6918152-A | European |
| Black vs. blond color | HERC2 | rs12913832-A | European |
| Black vs. blond color | intergenic; 15q13.1; WHAMMP2 - LOC100289656 | rs8033165-T | European |
| Black vs. blond color | OCA2 | rs11855019-G | European |
| Black vs. blond color | MC1R; CDK10 | rs258322-T | European |
| hair color | OCA2; HERC2 | rs12913832-A | European |
| hair color | IRF4 | rs12203592-T | European |
| hair color | SLC45A2 | rs16891982-C | European |
| hair color | MC1R; FANCA | rs12931267-G | European |
| hair color | MC1R; FANCA | rs12931267-G | European |
| hair color | ASIP; CDK5RAP1 | rs291671-G | European |
| hair color | SLC24A4; LOC105370627 | rs12896399-T | European |
| hair color | NR; SLC45A2 | rs16891982 | European |
| hair color | NR; LOC105375791 - MIR1302-7 | rs13263959 | European |
| hair color | NR; TPCN2 | rs3750965 | European |

Figure 6B: Hair traits (cont'd)

| trait | region, genes or loci | repr. SNP allele | study pop. |
|---|---|---|---|
| hair color | NR; KIRREL3, ST3GAL4 | rs4935969 | European |
| hair color | NR; IRF4 | rs12203592 | European |
| hair color | TYRP1; LOC105375976 - TYRP1 | rs13289810 | Solomon |
| hair color | EDNRB; SLAIN1 - EDNRB-AS1 | rs975739-G | European |
| hair color | IRF4 | rs12203592-C | European |
| hair color | KITLG; LOC105369887 - LOC728084 | rs12821256-C | European |
| hair color | SLC24A4; LOC105370627 | rs12896399-G | European |
| hair color | HERC2 | rs12913832-G | European |
| hair color | MC1R | rs1805007-C | European |
| male-pattern baldness | BQ013595, PAX1, BE789145; RPL41P1 - LINC01432 | rs2180439-C | European |
| male-pattern baldness | PAX1; LINC01432 | rs1160312-A | European |
| male-pattern baldness | AR; LOC105373240 - AR | rs6625163-A | European |
| male-pattern baldness | AR, EDA2R; LOC105373240 - AR | rs2497938 | European |
| male-pattern baldness | 20p11.22; RPL41P1 - LINC01432 | rs2180439 | European |
| male-pattern baldness | TARDBP; C1orf127 | rs12565727-A | European |
| male-pattern baldness | HDAC4; LOC105373962 - LOC100287387 | rs9287638-A | European |
| male-pattern baldness | HDAC9 | rs2073963-G | European |
| male-pattern baldness | AUTS2; LOC105375343 | rs6945541-C | European |
| male-pattern baldness | 17q21.31; SPPL2C, MAPT-AS1 | rs12373124-T | European |
| male-pattern baldness | SETBP1; SLC14A2 | rs10502861-C | European |
| male-pattern baldness | PAX1, FOXA2; LINC01432 | rs6047844-T | European |
| male-pattern baldness | AR; LOC105373240 - AR | rs2497938-T | European |
| morphology | AC016912.4; LOC105374582 - LOC101805491 | rs12623288-A | European |
| morphology | AC019176.2; CSMD1 - RSL24D1P7 | rs1454292-T | European |
| morphology | AC096559.2; LOC105373430 - LOC100506457 | rs17605562-T | European |
| morphology | AC113608.1; LOC105373441 - RPLP1P5 | rs7586898-C | European |

Figure 6C: Hair traits (cont'd)

| Trait | Genes or loci | repr. SNP, allele | Study Pop. |
|---|---|---|---|
| morphology | AL121890.2; SLC23A2 - LOC105372512 | rs261360-A | European |
| morphology | AL450992.4; LOC105373470 | rs10788819-T | European |
| morphology | EGF; KRT19P3 - EGF | rs17316633-A | European |
| morphology | FRAS1 | rs1268789-T | European |
| morphology | LCE5A; CRNN - LCE5A | rs908922-A | European |
| morphology | NAF1; LOC102724899 - MIR4454 | rs6840361-C | European |
| morphology | TCHH | rs11803731-A | European |
| morphology | THADA | rs6732426-T | European |
| morphology | TSHR; TSHR, LOC101928462 | rs8017455-T | European |
| morphology | WNT10A | rs7349332-T | European |
| morphology | TCHH; TCHHL1 - TCHH | rs17646946-A | European |
| morphology | LCE3E; CRCT1 - LCE3E | rs499697-G | European |
| morphology | WNT10A | rs7349332-T | European |

Figure 7: Eye color

| trait | region, genes or loci | repr. SNP allele | study pop. |
|---|---|---|---|
| Blue vs. green eyes | SLC24A4; LOC105370627 | rs12896399-T | |
| Blue vs. green eyes | TYRP1; LOC105375976 - TYRP1 | rs1408799-C | |
| Blue vs. green eyes | TYR | rs1393350-A | |
| Blue vs. green eyes | OCA2; HERC2 | rs1667394-A | |
| eye color | HERC2, OCA2; HERC2 | rs1667394-C | European |
| eye color | FBXL17 | rs288139-A | European |
| eye color | ADCY8/EFR3A; LOC105375759 - LOC105375763 | rs4596632-C | European |
| eye color | OCA2; HERC2 | rs12913832-A | European |
| eye color | SLC24A4; LOC105370627 | rs12896399-T | European |
| eye color | IRF4 | rs12203592-T | European |
| eye color | SLC45A2 | rs16891982-C | European |
| eye color | TYR | rs1393350-A | European |
| eye color | OCA2; HERC2 | rs12913832-A | European |
| eye color | SLC24A4; LOC105370627 | rs12896399-G | European |
| eye color | TYR | rs1847134-A | European |
| eye color | VASH2 | rs3002288-A | European |
| eye color | POLS; LOC102724943 | rs12520016-G | European |
| eye color | OCA2 | rs7173419-T | European |
| eye color | HERC2 | rs12913832-A | European |
| eye color | TYRP1; LOC105375976 - TYRP1 | rs1408799-C | European |
| eye color | SLC24A4; LOC105370627 | rs12896399-G | European |
| eye color | HERC2 | rs12913832-G | European |
| eye color | SLC24A4; LOC105370627 | rs12896399-G | European |
| eye color | NPLOC4, HGS; NPLOC4 | rs9894429-T | European |
| eye color | TTC3, DSCR9; TTC3 | rs1003719-A | European |
| eye color | HERC2, OCA; HERC2 | rs12913832 | European |

Figure 8A: Coffee and sleep

| trait | region, genes or loci | repr. SNP allele | study pop. |
|---|---|---|---|
| Caffeine consumption | CYP1A2, LMAN1L, SCAMP2, CPLX3, MP1, CSK, ULK3, COX5A, C14orf17; CPLX3 - ULK3 | rs6495122-A | European |
| Caffeine consumption | SCAMP5, PPCDC; PPCDC - C15orf39 | rs12148488-T | European |
| Caffeine consumption | NR; PROX2 | rs8014204-A | European |
| Caffeine consumption | NR; FANCA | rs16966142-T | European |
| Caffeine consumption | 4q22.1; SPP1 - LOC105377325 | rs2725236-A | European |
| Caffeine consumption | NR; LOC105379110 - LOC105379112 | rs7447447-T | European |
| Caffeine consumption | CYP1A2 | rs2472304-A | European |
| Caffeine consumption | NR; BAZ1B | rs2240466-A | European |
| caffeine insomnia | PRIMA1 | rs6575353 | European |
| caffeine insomnia | RP11-430J3.1; LOC105377152 | rs7628219-T | European |
| caffeine insomnia | RP11-479A21.1; ADRA2A - LOC105378484 | rs2065779 | European |
| caffeine insomnia | RP11-889D3.1; CACNA2D3 - LOC105377096 | rs11706236 | European |
| caffeine insomnia | MTUS2 | rs2388082 | European |
| caffeine insomnia | MTNR1B; MTNR1B - RPL26P31 | rs10830964 | European |
| caffeine insomnia | NEDD4L | rs158856 | European |
| caffeine insomnia | P2RY2; LOC105369381 - P2RY2 | rs1791933 | European |
| caffeine insomnia | AC105008.1; KHDRBS3 - LOC105375775 | rs16905439 | European |
| coffee consumption | CYP1A1, CYP1A2; CYP1A1 - CYP1A2 | rs2472297-T | European |
| coffee consumption | AHR; LOC105375170 - LOC101927609 | rs6968865-T | European |
| coffee consumption | CYP1A1, CYP1A2; CYP1A1 - CYP1A2 | rs2470893-T | European |
| coffee consumption | CPLX3, ULK3; CPLX3 - ULK3 | rs6495122-A | European |
| coffee consumption | NCALD | rs16868941-A | European |
| coffee consumption | LAMB4, NRCAM; LAMB4 - NRCAM | rs382140-A | European |
| coffee consumption | AHR; LOC105375170 - LOC101927609 | rs6968554-A | European |
| coffee consumption | POR, SNORA14A, TMEM120A; POR | rs17685-A | European |

Figure 8B: Coffee and sleep (cont'd)

| trait | region, genes or loci | repr. SNP allele | study pop. |
|---|---|---|---|
| coffee consumption | CYP1A1, CYP1A2; CYP1A1 - CYP1A2 | rs2470893-T | European |
| coffee consumption | NR; LOC105375551 - LOC105375553 | rs10227393-C | European |
| coffee consumption | GCKR, FNDC4; GCKR | rs1260326-T | European |
| coffee consumption | ABCG2, PKD2, PPM1K; ABCG2 | rs1481012-A | European |
| coffee consumption | AHR; LOC105375170 - LOC101927609 | rs4410790-T | European |
| coffee consumption | POR, SNORA14A, TMEM120A; POR | rs17685-A | European |
| coffee consumption | BDNF; BDNF - CBX3P1 | rs12288512-A | European |
| coffee consumption | CYP1A1, CYP1A2; CYP1A1 - CYP1A2 | rs2472297-T | European |
| coffee consumption | EFCAB5, SSH2, CCDC55; EFCAB5 | rs9902453-A | European |
| coffee consumption | MLXIPL, TBL2, VPS37D; MLXIPL | rs7800944-T | European |
| coffee consumption | NR; OPCML | rs4245116-T | European |
| insomnia | SLC2A13 | rs11174478-A | European |
| insomnia | CEP152 | rs2725544-C | European |
| insomnia | SATB2; LOC105373831 - SATB2 | rs12471454-T | European |
| sleep-related | MYRIP | rs6599077 | |
| sleep-related | 13q21.1; LOC101926897 - CTAGE16P | rs10492604 | |
| sleep-related | PDE4D | rs1823068 | |
| sleep-related | EYA1 | rs2218488 | |
| sleep-related | OPCML; NTM | rs1940013 | |

Figure 9A: Alcohol-related and taste

| trait | region, genes or loci | repr. SNP allele | study pop. |
|---|---|---|---|
| alcohol & nicotine codependence | NA; ISCA1P1 - LOC105378999 | rs10042968-G | European |
| alcohol consumption | C12orf51, ALDH2; HECTD4 | rs2074356-T | Korean |
| alcohol consumption | MYL2; LOC105369980 - LOC105369981 | rs12229654-G | Korean |
| alcohol consumption | CCDC63 | rs10849915-G | Korean |
| alcohol consumption | OAS3; OAS2, OAS3 | rs2072134-A | Korean |
| alcohol consumption | AUTS2 | rs6943555-A | European |
| alcohol consumption | NR; LOC105374823 - LOC101927987 | rs2100290-G | European |
| alcohol consumption | NR; TRPM8 | rs12472151-A | European |
| alcohol dependence | PECR; MREG - PECR | rs7590720-G | European |
| alcohol dependence | CAST, ERAP1; ERAP1 | rs13160562-G | European |
| alcohol dependence | PPP2R2B | rs1864982-A | European |
| alcohol dependence | ESR1 | rs6902771-C | European |
| alcohol dependence | 14q24.2; LOC100506411 - PCNX | rs36563-A | European |
| alcohol dependence | Xp22.2; CLCN4 - MID1 | rs12388359-T | European |
| alcohol dependence | C3orf31; LOC101929530 - SYN2 | rs6777876-G | European |
| alcohol dependence | ZNF124; LOC105373272 - ZNF731P | rs3738443-A | European |
| alcohol dependence | USP12; LOC105370123 - LOC105370124 | rs12020569-C | European |
| alcohol dependence | KIAA0040; TNN - KIAA0040 | rs6701037-C | European |
| alcohol dependence | PKNOX2 | rs750338-C | European |
| alcohol dependence | SYT17; ITPRIPL2 - SYT17 | rs8062326-T | European |
| alcohol dependence | NKAIN1, SNRNP40, ZCCHC17, FABP3, SERINC2; SERINC2 | rs4478858-G | European |
| alcohol dependence | NR; LOC105376876 - RUNX3 | rs3131513-G | European |
| alcohol dependence | 4q32.2; FSTL5 - LOC102724899 | rs4440177-A | European |
| alcohol dependence | NEIL2 | rs804292-G | European |

Figure 9B: Alcohol-related and taste (cont'd)

| trait | region, genes or loci | repr. SNP allele | study pop. |
|---|---|---|---|
| alcohol dependence | OPCML | rs1793257-A | European |
| alcohol dep., onset age | NR; C2orf88, LOC105373795 | rs62184315-T | European |
| alcohol dep., onset age | 3q26.1; LINC01324 - SI | rs2168784-T | European |
| alcohol dep., onset age | ARL15 | rs35951-G | European |
| alcohol dep., onset age | UTP20 | rs57083693-C | European |
| alcohol dep., onset age | NR; PEX14 - CASZ1 | rs61776290-T | European |
| alcohol dep., onset age | NR; ADAM17 | rs17362650-C | European |
| alcohol dep., onset age | NR; LOC101927881 - LOC151121 | rs1660895-A | European |
| alcohol dep., onset age | NR; ACKR3 - LOC105373946 | rs896543-G | European |
| alcohol dep., onset age | NR; LOC105376928 | rs9874556-A | European |
| alcohol dep., onset age | NR; LSAMP | rs16824395-A | European |
| alcohol dep., onset age | NR; LOC105374701 | rs16897978-C | European |
| alcohol dep., onset age | NR; LINC01170 | rs7448080-T | European |
| alcohol dep., onset age | NR; | chr7:112984787-A | European |
| alcohol dep., onset age | NR; ADAMTSL1 | rs10810935-A | European |
| alcohol dep., onset age | NR; LINGO2, LOC105376004 | rs12348435-C | European |
| alcohol dep., onset age | NR; RBMXP2 - KRT18P66 | rs10969853-T | European |
| alcohol dep., onset age | NR; LOC105378314 | rs17625382-G | European |
| alcohol dep., onset age | NR; LOC105370217 - PCDH17 | rs11840092-C | European |
| alcohol dep., onset age | NR; FAM81A | rs10519005-T | European |
| alcohol dep., onset age | NR; ZNF407 | rs9947276-T | European |
| alcohol dep., onset age | NR; NCAM2 | rs2826659-A | European |
| alcohol dep., onset age | NR; LARGE | rs5754638-T | European |
| alcohol dep., onset age | NR; DAB1 | rs35738462-T | European |
| alcohol dep., onset age | NR; LINC01397 - UBL4B | rs514341-T | European |

Figure 9C: Alcohol-related and taste (cont'd)

| trait | region, genes or loci | repr. SNP allele | study pop. |
|---|---|---|---|
| alcohol dep., onset age | NR; SLC6A9 | rs1362153-C | European |
| alcohol dep., onset age | NR; RASGRP1 - LOC105370775 | rs1874252-G | European |
| alcohol dep., onset age | NR; ANKRD44, ANKRD44-IT1 | rs1896857-A | European |
| alcohol dep., onset age | NR; | chr3:182062276-C | European |
| 12 mo consumption | HIP1 | rs237238-A | European |
| 12 mo consumption | 14q21.1; LRFN5 - LOC105370470 | rs2154294-G | European |
| alcohol dependence factor | 2q23.3; LOC105373684 | rs6716455-G | European |
| alcohol dependence factor | ANKS1; ANKS1A | rs2140418-C | European |
| alcohol dependence factor | 7q31.32; LOC105375478 - LOC105375480 | rs10253361-T | European |
| alcohol dependence factor | MBNL2 | rs9556711-G | European |
| alcohol dependence factor | 15q26.2; LINC00924 - LOC105370995 | rs933769-T | European |
| alcohol dependence factor | 21q22.3; COL6A1 - LOC105372842 | rs4293630-A | European |
| alcohol dependence factor | 2q23.3 LOC105373684 | rs6716455-G | European |
| alcohol dependence factor | 3q27.1; LOC105374252 | rs3930234-C | European |
| alcohol dependence factor | 5p13.1; LINC00603 - LOC105374736 | rs2548145-G | European |
| alcohol dependence factor | ANKS1; ANKS1A | rs2140418-C | European |
| alcohol dependence factor | MBNL2 | rs9556711-G | European |
| alcohol dependence factor | DCC | rs768048-C | European |
| heaviness of drinking | 1p13.2; LOC105378916 - LOC105378917 | rs195204-T | European |
| heaviness of drinking | 3q22.1; NPHP3-AS1 - TMEM108 | rs2369955-A | European |
| heaviness of drinking | 4q13.3; MUC7 | rs1109501-G | European |
| heaviness of drinking | 9q22.2; GADD45G - UNQ6494 | rs10908907-G | European |
| heaviness of drinking | 13q12.2; RASL11A - LOC105370126 | rs9512637-C | European |
| heaviness of drinking | 14q22.2; LOC105370504 | rs1380131-C | European |
| heaviness of drinking | C15orf32 | rs8040009-T | European |
| heaviness of drinking | 21q21.1; LINC00308 - MAPK6PS2 | rs2827312-G | European |

Figure 9D: Alcohol-related and taste

| trait | region, genes or loci | repr. SNP allele | study pop. |
|---|---|---|---|
| Pulse pressure interaction | CRIPT, SOCS5; LOC105374584 - LOC105374585 | rs4953404-G | individuals |
| Pulse pressure interaction | ZNF716; LOC105375300 - LOC105375301 | rs11766519-C | individuals |
| Pulse pressure interaction | 11p12; LOC101928563 - LOC105376637 | rs12292796-C | individuals |
| Pulse pressure interaction | CRIPT, SOCS5; LOC105374584 - LOC105374585 | rs4953404-G | individuals |
| flushing response ("Asian lobster face") | 14q24.2; SIPA1L1 | rs11158907 | Han Chin. |
| flushing response ("Asian lobster face") | 8q24.22; LOC101927845 | rs4909801 | Han Chin. |
| flushing response ("Asian lobster face") | ALDH2 | rs671 | Han Chin. |
| odorant perception (β-damascenone) | OR5BN1P; OR8H3 - OR8J3 | rs2220004 | European |
| odorant perception (β-ionone) | OR4D6; OR5A1 - OR4D6 | rs7943953 | European |
| odorant perception (isobutyraldehyde) | NDUFA10, OR6B2; NDUFA10 | rs13424612 | European |
| sensory perception of smell | OR2M7; OR2M7 - OR14C36 | rs4481887-G | European |
| bitter taste perception | Tas2R46; PRH1-PRR4, PRH1 | rs2708377 | Eur. & other |
| bitter taste perception | Tas2R38; OR9A4, TAS2R38 | rs10246939 | Eur. & other |
| bitter taste perception | Tas2R31, Tas2R43; PRH1-PRR4, PRH1 | rs1031391 | Eur. & other |
| bitter taste perception | TAS2R38; TAS2R38, OR9A4 | rs713598 | Eur. & other |
| sensory perception of taste | NR; HHLA1 | rs2014357 | Eur. & other |
| pain | LOC400680, ZNF429; LOC105372321 - LINC00664 | rs2562456 | European |
| pain | NR; MPZL2 - CD3E | rs17122021 | European |
| pain | NR; LOC101928219 | rs6693882 | European |
| pain | CCT5, FAM173B; LOC285692 - LOC105374650 | rs13361160-C | European |

Figure 10A: Other

| trait | region, genes or loci | repr. SNP allele | study pop. |
|---|---|---|---|
| acne, severe | NR; LOC102723906 | rs7660345-T | Han Chin. |
| acne, severe | SGOL1; LOC101927829 - LOC105376987 | rs75430906-A | European |
| acne, severe | LINC00691, NKIRAS1, NR1D2, RPL15, THRB, UBE2E1, UBE2E2; UBE2E1 | rs28405582-C | European |
| acne, severe | LOC643723, LOC728463, RRP15, TGFB2; TGFB2 - LOC105372924 | rs1159268-A | European |
| acne, severe | SELL; SELP - SELL | rs7531806-A | Han Chin. |
| acne, severe | DDB2; C11orf49, LOC105376663 | rs747650-G | Han Chin. |
| Acoustic startle blink response | 3q13.12; LOC101929534 - LOC344593 | rs2399126 | European |
| Acoustic startle blink response | 3q21.1; EIF4BP8 - PARP14 | rs790110 | European |
| Acoustic startle blink response | 5q32; PRELID2 | rs2112743 | European |
| Acoustic startle blink response | DIRC3 | rs1002353 | European |
| Acoustic startle blink response | 4q34.3; LOC105377563 - LOC105377564 | rs13125519 | European |
| Acoustic startle blink response | CACNA1C | rs956451 | European |
| aging, facial | FBXO40, STXBP5L; LOC105374069 | rs322458-G | European |
| aging, facial | FBXO40, STXBP5L; LOC105374069, STXBP5L | rs322458, rs17740066 | European |
| aging, facial | FBXO40, STXBP5L; LOC105374069, STXBP5L | rs322458, rs6782025 | European |
| aging, facial | POLQ, FBXO40, STXBP5L; LOC105374069, FBXO40 | rs322458, rs6775899 | European |
| arm span | MBNL2; MBNL2 - RAP2A | rs4771996-G | Hispanic |
| arm span | VSIG10 | rs7957470-G | Hispanic |
| arm span | IPMK | rs2790232-A | Hispanic |
| arm span | POU3F2; LOC105377910 - POU3F2 | rs1383808-G | Hispanic |
| contact dermatitis, nickel | NTN4; PGAM1P5, NTN4 | rs2367563-A | Korean |

Figure 10B: Other (cont'd)

| trait | region, genes or loci | repr. SNP allele | study pop. |
|---|---|---|---|
| contact dermatitis, nickel | PELI1 | rs6733160-C | Korean |
| earlobe, attached | NR; LOC105373723 - LOC101929532 | rs2270447 | European |
| earlobe, attached | NR; KIAA1217 | rs11013962 | European |
| facial morphology | PAX3 | rs7559271-G | European |
| facial pigmentation | IRF4 | rs12203592-T | European |
| facial pigmentation | BCN2; BNC2 - LOC105375983 | rs62543565-C | European |
| facial pigmentation | MC1R, C16orf55, SPATA33; SPATA33 | rs35063026-T | European |
| facial pigmentation | ASIP, RALY; RALY | rs6059655-A | European |
| freckles | SEC5L1, IRF4; LOC105374875 | rs1540771-A | |
| freckles | ASIP; RPS2P1 - ASIP | rs1015362-G, rs4911414-T | |
| freckles | TYR | rs1042602-C | European |
| freckles | MC1R | rs1805007-T | European |
| freckles | IRF4 | rs12203592-T | European |
| freckles | MC1R; FANCA | rs12931267-G | European |
| freckles | ASIP; EIF6 | rs619865-A | European |
| freckles | BNC2 | rs2153271-C | European |
| hand grip strength | ZNF295; ZBTB21 | rs8133949-T | European |
| hand grip strength | TNRC6B | rs6001832-G | European |
| handedness | 3p22.2; LOC105377643 | rs883565 | European |
| handedness | 9p24.1; AK3 - RPS5P6 | rs296859 | European |
| skin pigmentation | SLC24A5; LOC102724553 - SLC24A5 | rs1834640-G | South Asian |
| skin pigmentation | TYR | rs1042602-C | South Asian |
| skin pigmentation | SLC45A2 | rs16891982-C | South Asian |
| skin sensitivity to sun | ASIP; RPS2P1 - ASIP | rs1015362-G, rs4911414-T | |
| skin sensitivity to sun | TYR | rs1393350-A | |

Figure 10C: Other (cont'd)

| trait | region, genes or loci | repr. SNP allele | study pop. |
|---|---|---|---|
| skin sensitivity to sun | MC1R | rs1805007-T | |
| sneezing | 2q22.3; LOC105373661 - LOC105373664 | rs10427255-C | European |
| sneezing | NR; HCG27 | rs6903896 | European |
| sunburns | NTM | rs12421680-A | European |
| sunburns | IRF4 | rs12203592-T | European |
| sunburns | TYR | rs1126809-G | European |
| sunburns | MC1R | rs1805007-C | European |
| suntan & tanning | MATP; SLC45A2 | rs35391-T | European |
| suntan & tanning | PPARGC1B | rs32579-A | European |
| suntan & tanning | EXOC2; LOC105374875 | rs12210050-T | European |
| suntan & tanning | GRM5 | rs10831496-G | European |
| suntan & tanning | TYR | rs1393350-A | European |
| suntan & tanning | LOC440100; LOC105378250 - HOXC13-AS | rs7969151-A | European |
| suntan & tanning | 14q32.2; PAPOLA - LOC105370645 | rs17094273-A | European |
| suntan & tanning | MC1R; DBNDD1 | rs11648785-T | European |
| suntan & tanning | PRDM15 | rs7279297-G | European |
| suntan & tanning | MC1R; CPNE7 - DPEP1 | rs154659-C | European |
| suntan & tanning | IRF4 | rs12203592-C | European |
| suntan & tanning | TYR | rs1126809-G | European |
| suntan & tanning | HERC2 | rs12913832-G | European |
| suntan & tanning | MC1R | rs1805007-C | European |
| suntan & tanning | ASIP; RPS2P1 - ASIP | rs4911414-G | European |

SHARING PROBABILITIES FOR USER TRAITS

CROSS-REFERENCE TO RELATED APPLICATIONS

This application claims the benefit of priority of U.S. provisional applications 62/149,524, filed Apr. 18, 2015, and 62/297,125, filed Feb. 18, 2016, the contents of both of which are incorporated herein in their entirety.

TECHNICAL FIELD

This invention relates to educational applications in genetics, and more particularly to applications for sharing probabilistic information about user traits.

SUMMARY OF THE INVENTION

High school students are typically exposed to basic concepts in human genetics in biology classes. Their course materials can cover Mendelian inheritance, dominant and recessive alleles, and may discuss the segregation of alleles during meiosis. It can be difficult, however, for students and even scientifically sophisticated adults to have an intuitive grasp of the role of probability in the inheritance of physical traits.

In recent years, social media has occupied much of the attention of students outside of class. This invention provides an educational application and the infrastructure for demonstrating principles of biological inheritance to users. The system gathers information from one or more users, sharing certain information across social media or other data channels. At the same time, the deterministic and probabilistic contributions of genetics are explained and demonstrated so that users can generate and play with real and hypothetical combinations of their traits and share the results with their friends in an educational and instructive context. The quality of the user profiles and predictions will be strengthened by the increasing body of research on clinical outcomes, as well as the availability of genetic testing and sequencing to consumers. The invention incorporates permissions and privacy features to protect user identity and health information. The invention provides opportunities in a game-like setting for educational genetics and health information to reach younger users, many of whom will benefit from access to advances in precision medicine. The invention also creates opportunities to open conversations with students and adult users about their probabilities for genetic traits, discussing the current knowledge and its limitations, in an informal setting over food and drink.

User 2 can also, with User 1's permission, forward User 1's HaploFile to other users, for example to friends and acquaintances in the circles of her social network (User 3 and User 4). Depending on User 1's permissions and User 2's preference and intentions, the forwarded information can identify User 1 overtly, or can be partially or completely anonymized. As shown, User 1 allowed his HaploFile to be forwarded to multiple degrees of social connection, although the forwarding permissions can be selectively limited, as illustrated with User 2. With User 3, upon receiving a request and information from User 2, he opted to forward information to User 6, but not to User 8, though successfully initiating a separate exchange of HaploFiles with the latter.

Figure 5:
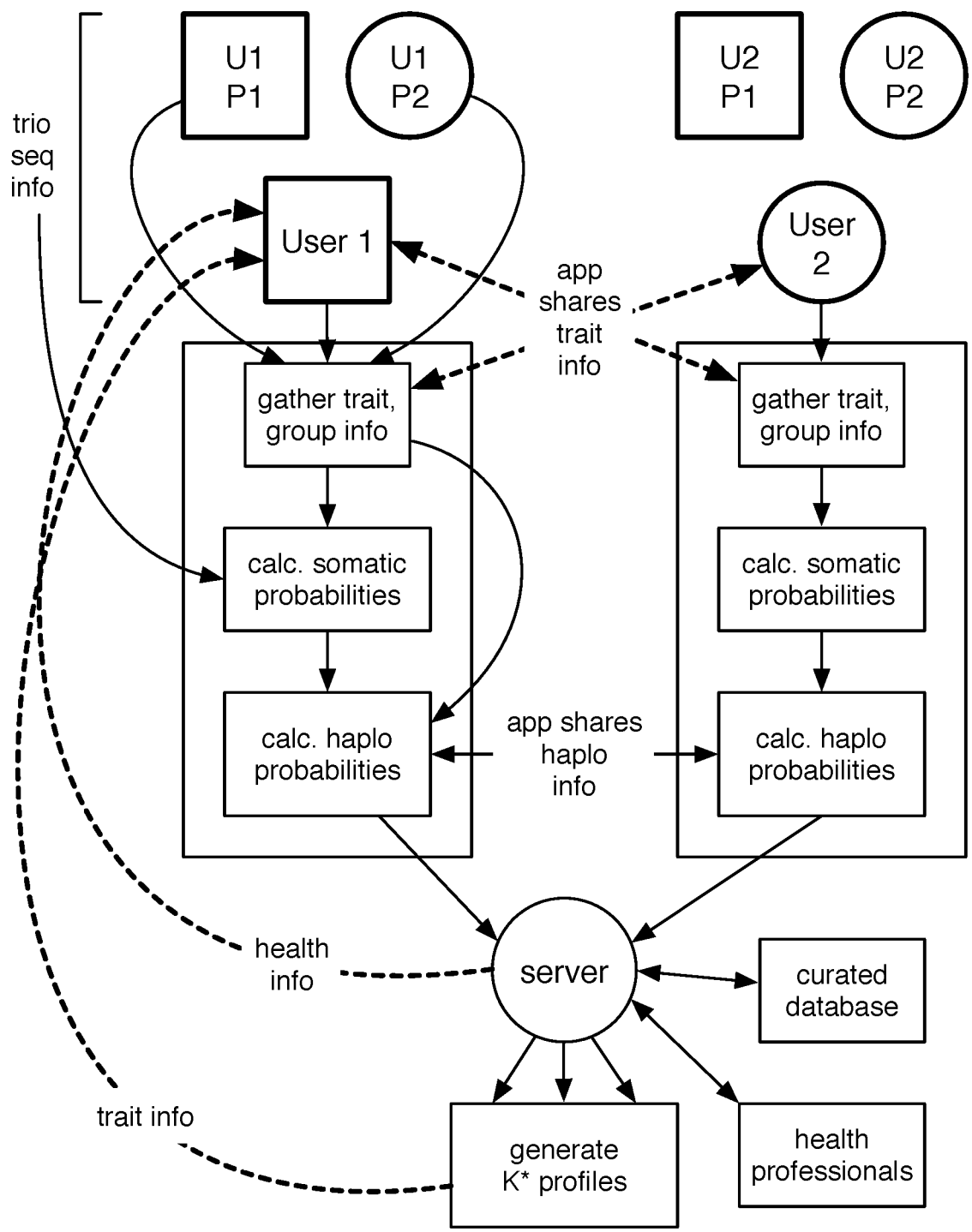

FIG. 5 illustrates flows of information between users and their parents (U1P1, U1P2 etc.) as gathered and generated by the invention. The quality of an allelic probability model can be improved significantly when trait and group information is available from one and preferably both of the user's parents. When genotypic or sequence information is available from a user and the user's parents (sometimes termed a "trio"), the level of confidence for providing high-quality health and trait information is increased, especially when the information for all three is of comparable quality, coverage, and depth. Naturally, the confidence can be improved further if information from grandparent- or even great-grandparent levels is available and taken into consideration to refine the probabilistic profile.

Representative lists are provided of genetic loci that affect hair (FIGS. 6A, 6B, and 6C) and eye color (FIG. 7), as well as loci that may affect the perception or preference for caffeinated products such as coffee and sleep (FIGS. 8A and 8B), and other loci related to alcohol that may be related to food or drink products (FIGS. 9A, 9B, 9C, and 9D), particularly fermented or brewed beverages such as beer. In the first column, a physical trait is provided. In the second column, a gene or a locus designation is given. Some intergenic associations are identified by chromosome region. A representative allele is often listed for a SNP, although it should be understood that this allele is listed to provide an example of a variant and is not an exhaustive list of alleles for a SNP, the gene or locus. These lists are not intended to be exhaustive, and loci from any one figure are expected to influence multiple traits.

FIGS. 10A, 10B, and 10C provide illustrative loci for several other traits that can be applied in the invention.

DETAILED DESCRIPTION OF THE INVENTION

This invention provides a system for gathering information from one or more users, sharing certain information across social media and other data channels, and generating a series of probability distributions of alleles for traits of the user and of hypothetical progeny, to be shared among users and their friends. The invention can display a profile of traits based on the probability distributions for each trait, in response to a user command.

Infrastructure

The system uses a software application (or "app") that can reside on a device to provide an interface to a user. The application can also be a browser-based interface that connects to the other components of the system via a data connection, such as the Internet.

A "device" means any computing device that can receive user input and display information. It will typically have its own central processing unit (CPU) and memory, connected with the input/output hardware by a communications bus. Devices include portable devices, such as cell phones and smart phones, tablets, and other handheld devices. Devices also include traditional stand-alone computers such as desktops and mainframes, including supercomputers. For purposes of the invention, a device can also be a virtual machine implemented in software or a combination of software and hardware.

Figure 1:
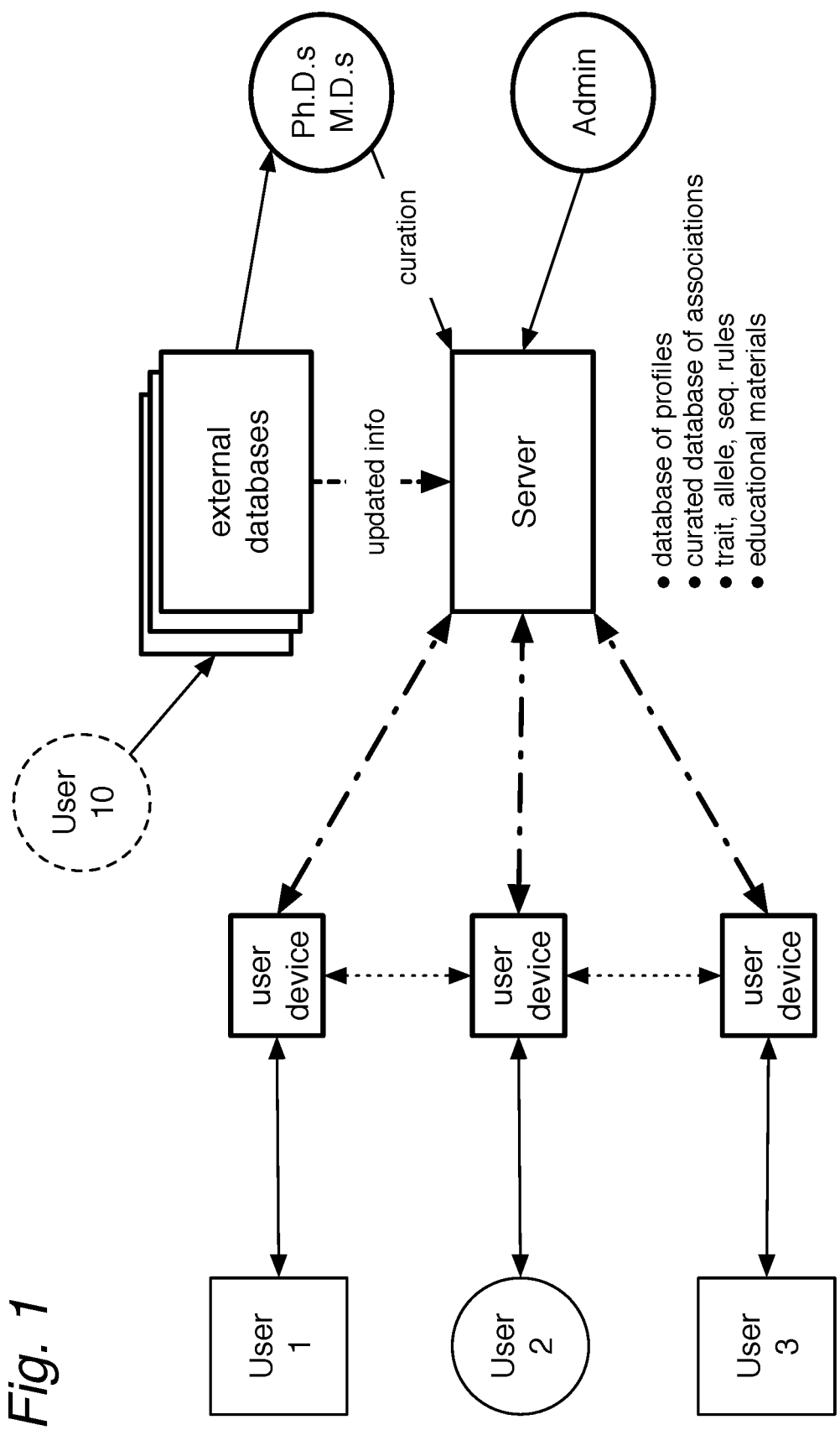
FIG. 1 shows various components of the invention and general relationships in schematic form. One or more users can interface via individual devices, which are connected by data communication channels to a Server. Various types of information can be maintained on the Server, for example a database of User Profiles; a database of associations among physical traits, genetic markers, and alleles, and health information; a database of rules and heuristics for predicting or estimating probabilities for alleles from user traits and sequence data. The Server can also have context-sensitive educational materials that can be customized and provided to users, such information about genetics, diseases, or have information about food and drink preferences. Some of these materials can be mined from external sources, such as publicly available databases. Preferably the data is also gathered, evaluated, and summarized by qualified experts in the field to interpret the information at an age-appropriate level.
Figure 2:
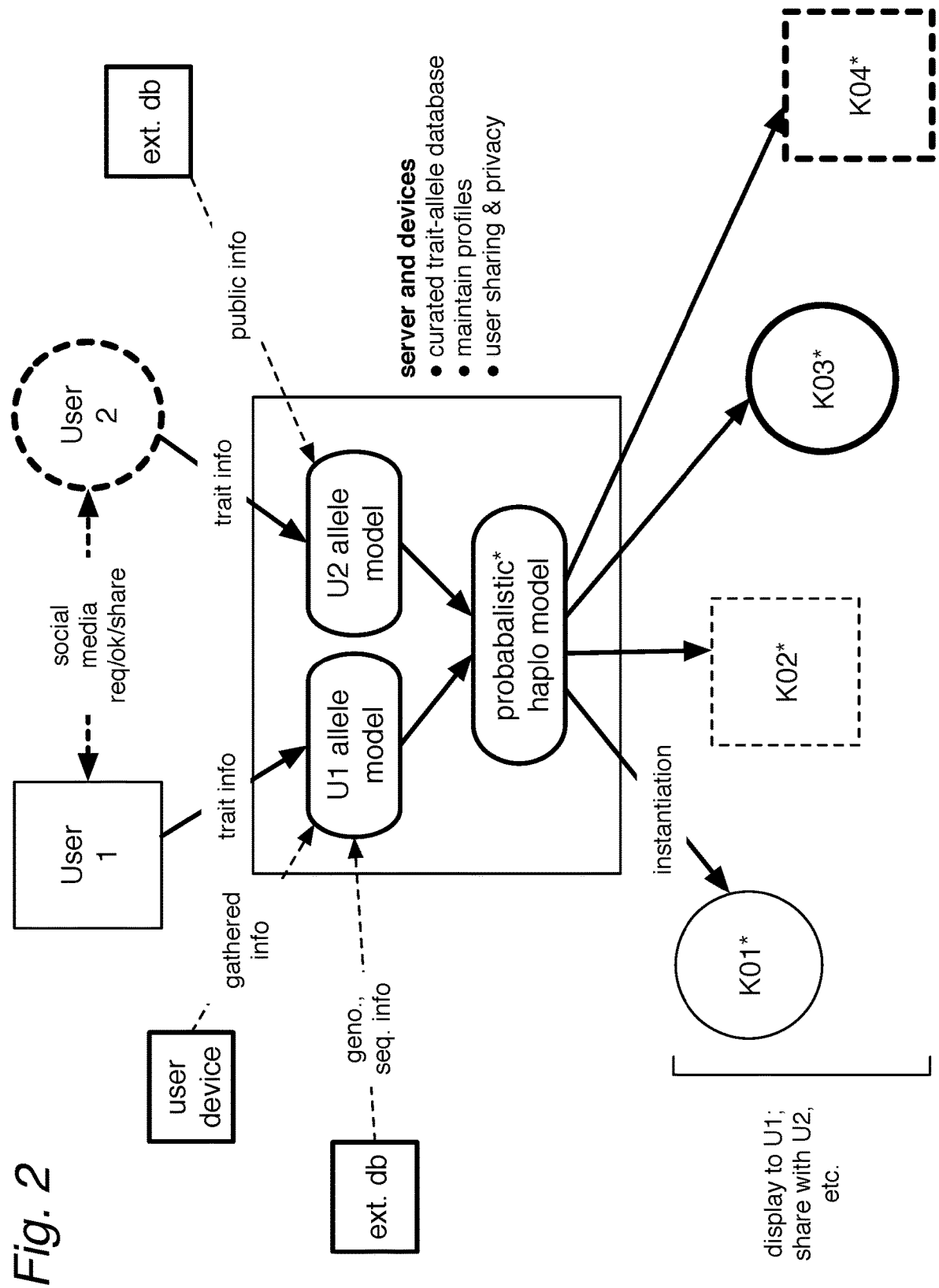
FIG. 2 illustrates one embodiment where flows of information are collected and shared from User 1 and User 2 to generate models of the invention, which are used to create hypothetical* profiles for K01*, K02*, K03*, K04*, etc. As described in greater detail below, the invention provides a system for gathering user information from a variety of sources: self-reported trait information, physical trait information gathered from devices or other users, genetic or sequence information for a user (for example entered directly by the user or gathered with the user's permission from an external database). Information from external databases can be obtained, such as publicly available data. The information from various sources is then used to generate an allele model for the users, whether performed on the users' devices, on one or more Servers, or various combinations of each. The allele models are then used to generate a probabilistic model for hypothetical progeny. An instance of the model is generated (K01*), showing traits inherited from the users, and as many additional instances (K02*, K03*, K04* and so on) can be generated according to the model as desired by the user(s), until limited by user device resources.
Figure 3:
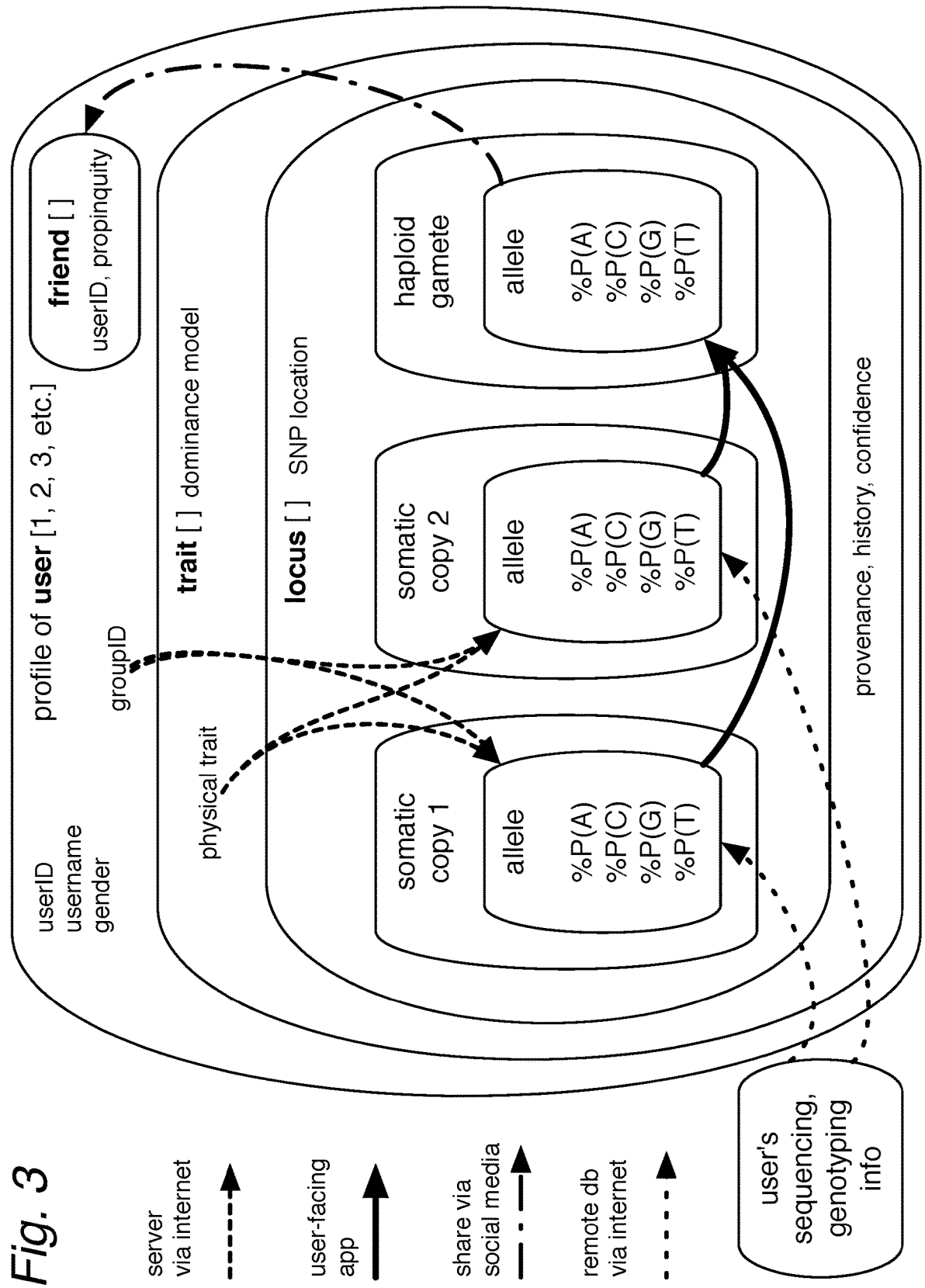
FIG. 3 illustrates the organization of a representative database of user Profiles, discussed in more detail in Example 1, including arrows to show flows of information.

One or more devices can be connected to a "server" via electronic communication channels for data. A server typically has its own CPU, memory, input, and output. A "channel" is typically a connection to the Internet shown by stippled line in FIG. 1. Portions of the channel can be hardwired or wireless, such as by a mobile carrier's data service or WiFi. The channels serve to connect the server with the end users and, for social media, with each other.

The server hosts a "database" that can be queried by the application and return information to the app. The database can contain information on associations between traits, loci, and alleles. A database can be populated by automated queries to other databases, such as publicly available databases. A database can also be "curated" by updating from other scientific databases and/or regular review by scientists and other professionals for technical accuracy. The curated database can also contain population genetics data and associated health information, and related educational materials for transmission and use by the app. In addition, the database can contain information about physical traits that can be expressed as preferences for certain styles of food, drink, and other products and services.

While the database can be updated as often as possible, no database of genetic loci, alleles, or their associated traits can be a considered the same as nature or be a perfect representation as they occur in nature. The most current information for the human population as a whole, extrapolated from samples of often-arbitrary subpopulations, is inevitably incomplete. Thus, the word "probabilities" is used herein to describe mathematical models for alleles and traits, based on available information reported from studies performed under constraints. Accordingly, the stochastic component of a probabilistic model for a trait arises not only from independent assortment of loci during meiosis I, but from the incomplete knowledge of all human allele-trait associations and intergenic interactions. The probabilistic prediction is a best guess that is embodied by displaying to the user a profile of traits, which can be generated in response to user commands. The probabilistic nature of the models provides an opportunity to educate users that prediction of many traits can be imperfect and is not necessarily deterministic, whether in user preferences for food and drink or with physical traits and the risks of developing diseases.

A "user", such as U1, U2, etc., typically refers to a person who can have a set (or "profile") of traits. A user can be a hypothetical person who has a profile of traits. A user can also be an animal, plant, or other organism with a profile of traits. For purposes of managing profile information, a user can be identified by a unique numerical identifier or "userID".

Information from user profiles can be used by the invention to generate probabilistic profiles for the user or for hypothetical (often indicated by an asterisk*) progeny, indicated by K0P, K02*, K03*, etc.

Gathering User Information for a Profile

In a typical user experience, a first user (U1) creates a user profile on an application that resides on a device to provide an interface to the user. When a profile for a user is established and assigned a userID, the profile may at first contain little or no information, but information can be gathered by a variety of means. Information can be provided by the user by entry into a user device, for example in response to a series of questions about the user's physical traits. Such information may also be contributed by another person, who is able to observe, assess or interview the user.

A "trait" as understood by geneticists is any characteristic that is inherited across generations. The number of physical traits of a user that can be associated with a genetic component is constantly growing and being revised. For example, ABO and Rh blood types will be familiar to most users. Other Mendelian traits include wet and dry earwax, and albinism. Lactose intolerance in infants (congenital lactase deficiency) can be caused by mutations in the LCT gene. Variation in lactose tolerance in adults can result from differences in the MCM6 gene, which regulates LCT. While some may have lactase persistence into adulthood, others adults are "lactose intolerant," which can be considered a trait manifested in physically discernable ways and can be expressed as a decreased or negative preference for milk-containing foods.

Other traits are presently understood to be the result of multiple genes or loci, or their interactions, such as with hair and eye color. Sometimes these non-Mendelian traits are called complex or quantitative traits and loci. Several hundred genetic loci are believed to contribute to adult height and can account for up to 60% of heritability of this once-apparently simple trait. Numerous genetic variants have been identified that are correlated with obesity, body mass, adiposity, diabetes, and cardiovascular health. Other genetic variations affect physical traits such as metabolism of caffeine (AHR, CYP1A2, POR, ABCG2), particularly its rate of metabolism; muscle mass (MSTN allele K153R for increased post-training mass); muscle fiber type (ACTN3, fast-twitch fibers R577X, endurance 577XX, and sprint or power-lifting 577RX, 577RR); and distribution of adipose tissue (GIPR down-regulation). Several other loci are associated with self-reported chronotype preference for mornings (such as AKS, ALG10B, APH1A, DLX5, FBXL13, FBXL3, HCRTR2, NOL4, PER2, RASD1, RGS16, TOX3, and VIP).

The weighing of alleles for even a few loci, even if determined by sequencing, presents calculations of many equations and many variables that rapidly overwhelm the ability to calculate by hand or a simple spreadsheet, but require probabilistic modeling by high-speed computers.

Physical traits are not limited to externally visible features, but include a user's sensory abilities. Senses can be characterized as the physical methods of perception, a faculty by which outside stimuli are perceived. The physical manifestations perceived as the senses are commonly referred to taste, smell, hearing, sight, touch, but include other ways of perceiving phenomena. Taste and smell are governed by chemoreception, the direct interactions of chemical compounds with the physical receptors of cells on the surface of their organs. It is through these reactions with cell surface receptors that signals are sent to the brain to develop a sensory perception. There are more than 300 odor receptor genes and more than 10,000 scents that can be recognized by human senses.

Many taste receptor genes belong to the TAS2R family (taste receptor type 2), which can be divided into family type 1 (sweet, TAS1R2—TAS1R3) and family type 2 (bitter (TAS2R1—TAS2R50 and TAS2R60), which form dimers or multimers. For example, genetic variations in the TAS2R38 gene, which encodes a taste receptor, affect the user's relative ability to taste the flavor of bitter compounds, such as phenylthiocarbamide (PTC) and 6-n-propylthiouracil (PROP). Persons who have a relatively higher ability to taste the presence of bitter compounds in a food or drink (such as those with an A49P or V262A mutation) can have an aversion or decreased preference for such foods or drinks, while those with a relatively lower ability to taste such compounds can have less aversion or indifference, or even a positive preference for foods and drinks that contain a bitter component, such as kale, Brussels sprouts, karela (bitter melon), liver, hops, or tannins.

Genetic variants (such as R757C, A5T, and R247H of TAS1R3 or A372T of TAS1R1) increase the taste perception of umami or the savory "meatiness" from L-glutamate and other amino acids in foods. While a preference for complex or simple carbohydrates (such as breadiness or sweetness) may be acquired in part by individuals or influenced by upbringing or culture, it is believed that variations in the T1R genes can contribute to perception and desirability for sweet flavors in foods and drink, as well as an increase in the perceived sweetness of ethanol (β-glucopyranoside receptor encoded by TAS2R16, K172 allele). For some users, an increased sensitivity to certain thiol compounds may have a genetic contribution for relative aversion to onions or garlic.

Genetic variations can affect user preferences for foods with more or less fat (sometimes described as "richness", CD36), saltiness, sourness or acidity (ACCN1, TASK-1), spiciness (as with capsicum, TRPV1), coolness (as with menthol, CMR1), or viscosity (sometimes described as "mouthfeel"). Some genes are known to affect digestion or gastrointestinal function, for example the DQ2 and DQ8 alleles of HLA type II genes in celiac disease, where an aversion to bloating and gassiness may be manifested as a user preference.

Other genetic variations may affect user preferences for certain smells (such as the notes in fragrances or the aromas or bouquet in food and drink). Still other genetic variations may account for user preferences for higher or lower pitched sounds or for tactile characteristics. These genetically related sensory preferences, or variations in processing sense information, may be related to the users who are highly sensitive persons (HSPs). By contrast, some people with variants in their PRDM12 or SCN9A genes are less able to perceive pain. Thus, the physical traits in the invention extend to any probabilistic correlation between genetic information and traits that govern our perception of stimuli and also extend to traits that can be manifested or expressed as individual preferences for certain sensations over others.

Other senses can have a genetic component. Photoreceptors in the eye as well as physical features of the ocular musculature and retina can influence the perception of sight. Physical features such as the ear canal and the mechanoreceptors (hair cells with stereocillin microvilli) play essential roles in the perception of sound.

The quality of allelic interpretation of phenotypic traits can be improved if information about the user's ethnic or hereditary background ("group") is available and that background has been studied for allelic frequencies. Group information can be important in the probabilistic modeling of trait outcomes from genetic alleles. Some SNP variants associated with a defined trait are found only within certain group populations, while other SNPs associate with the same trait outcomes, but are found in a uniquely different human population. For example, in the tables of FIGS. 6 to 10, information about groups is provided for the population in a particular study, so membership in the study population can be used to refine the probabilistic profile of the user. Therefore, having group information about a user can help the modeling of trait outcomes as well as be instructive to the users about random mutation and the genetic diversity that was acquired in the deep ancestry of human migrations around the globe.

While recognizing that race and ethnicity can be largely social constructs, with fluid definitions over human history, data sets are available on individuals who identify with a particular group or geography. If desired, the user can enter group information, such as Chinese, Japanese, and Korean. More detailed information on subpopulations is often available, for example at county level in the United Kingdom. Where immigrant subpopulations have been studied, group information such as Chinese-American, Chinese-Vancouver, and Chinese-Baja ("Chino") can be used. The application can offer the option of entering no group information, self-identification for multiple groups, assigning designated groups with differing weights, or infer group information from genotype information (elaborated below). The application can implement this selection feature by offering a scrollable menu that allows the user to select one or more groups. This feature presents several teachable moments for users on racial constructs.

User Genotyping and Sequencing Information

If the user has genotypic information, this can be entered as well. As consumer genotyping and sequencing becomes more widely available and affordable, increasing numbers of users will have genotypic information, usually stored in remote databases. Genetic information can be in the form of a base or nucleotide (e.g. A, C, T, G) that is present in a copy at a genetic locus. When there is a known or newly found variation at a locus, this can be identified, such as by a single-nucleotide polymorphism (SNP). A SNP is often indicated by reference to a standardized designation, such as an rs or ss number on databases such as dbSNP. Information about a user's epigenetic status, such as methylation or histone modification can supplement the genotypic information. Information about a user's transcriptome, metabolome, and proteome can also be useful. Further information can be obtained by genetic testing of an individual's microbiomes, such as intestinal and skin microorganisms.

With the user's permission, the application can query the remote database for information on the user's traits and sequence information, which can then be transferred to the application or server under appropriate security and privacy protocols. In some cases, raw sequence information can be transferred to the server for initial analysis to discern the relevant allelic information, which can be forwarded to the user's device. If a sequence is provided, it can be compared with a reference genome and can be scanned for informative markers and alleles. As the computing power of portable devices increases, however, data may be received directly from the external database.

The user can register with external services that provide current health information associated with traits, genetic markers, and sequence data. The external services can be free or paid on various subscription models, and can have options for setting up account profiles and contributing user information under appropriate privacy permissions and controls. Information from the external services can be provided to the user and health professionals in support of patient education, precision medicine, and carrier screening and counseling. In a particular embodiment, the external service can provide information about products or services that are predicted to be correlated with a physical trait in a user's probabilistic profile.

User Images

A user profile can also be built from information gathered by the device. For example, most smartphones and tablets have an integrated camera that can be used to take a photograph of the user. With image-analysis software on the device or integrated with the app, certain traits such as hair and eye color can be gathered without requiring separate user input. Recent studies suggest that variations in facial bone structures are associated with certain genetic loci, and this information may be obtained by capturing the positions of landmark points on faces reconstructed from 2D, stereo, or 3D images. Many smart phones and watches also monitor physical activity, body temperature, and other physiological parameters that can contribute to the assessment of fit to a defined physical trait. While accuracy of such measurements is desirable, an immediate goal is to provide educational information about various traits for sharing and to stimulate discussion and learning. As more reliable associations emerge, the quality of the information, predictions, and teaching opportunities will improve.

The same photograph can be part of the user's profile to help identify the user as a profile photo when sharing the profile with others. The profile photo can also be selected by the user from a previously existing image, such as from a user's photo album on the device.

Location Services

If the user's device has the capability to determine the location of the user, this information can be gathered, preferably with the user's prior permission, to contribute information to the user's profile and to optimize location and sharing with other users. Location-based services can be based on self-reporting of a user's address or zip code, or can be real-time. Examples of real-time location detection include identification of the closest cellular base stations or WiFi hot spots and satellite telemetry.

Completing the Profile

After completing a user profile, the user can save the profile locally on the device or remotely on the server. The user can log off or automatically log off after expiration of time. The user may also begin to enter profile information, but pause entry and save the profile to be completed later.

The profile can be protected by the desired level of privacy controls. If desired, the profile can be anonymized so the information cannot be traced back to the individual person. For example, a user may have several userIDs, which may be stored on the user's device, or linked on a remote database, or the association between a user and the profile can be encrypted by various private- and public-key methods available.

While logged into the app, a user can send a notification to one or more friends that a profile has been created. This can take the form of an invitation for the friends to download or access the application on their own devices and to create their own user profiles. The first user can also send selected information from his own profile to the other friends. The act of invitation or sharing may trigger the application to unlock new functionalities for the user. This "reward" event acts to facilitate the spreading of the educational app and material as well as act to increase the education-resources available to the acting user and further engaging them in learning about sophisticated genetics.

Friend Profiles

Profiles of friends (U2, U3, etc.) can be constructed as discussed above. For example, when a friend's profile is created, an alert can be sent to a user with selected information about the friend's profile.

Profiles for persons who are not acquaintances may also be created based on information provided by a user. For example, some celebrities have made certain genetic information known to the public in addition to their physical traits. This information can be used to generate hypothetical profiles (U10*) to be used and shared. These profiles can also be sent to other users via social media or other data channels.

Generating Probabilistic Allele Profiles

The information gathered from a user profile can then be analyzed to generate a probabilistic allele model for various traits. The user's application can begin by querying a database for information on the alleles associated with the traits. If the user's group is known, the database can be further queried for additional information about population genetics. For each instance, a probability is generated based on the information obtained about the user.

Previous, numerically intensive methods for resolving haplotype phasing were based on limited information, but has largely been superseded by availability of sequencing data for individuals and populations. This earlier degree of investigation is not always necessary for generating a probabilistic profile for educational purposes.

Generating Haplotype Files

The user's application may share the profile of the user with another user. In some embodiments, only selected information is shared (sometimes called Permissions or Permissioning), for example a unique userID, for selected loci, the frequency for each alleles, and under defined privacy settings. In a particular embodiment, a minimal packet to convey haplotype information (a HaploFile) can have the following information:

userID: 14159
    gender: M
    locus[951] (ABO blood group)
        locusID[1]: rs8176719
            gamete[del]: 0.357
            gamete[G]: 0.643
        locusID[2]=rs8176746
            gamete[A]: 0.429
            gamete[C]: 0.571
        locusID[2]=rs8176747
            gamete[C]: 0.429
            gamete[G]: 0.571
    locus[470] (red hair)
        locusID[1]: rs1805005
            gamete[G]: 0.576
            gamete[T]: 0.424
        locusID[2]=rs1805006
            gamete[C]: 0.740
            gamete[A]: 0.260
        locusID[3]=rs2228479
            gamete[G]: 0.608
            gamete[A]: 0.392
        locusID[4]: rs1805007
            gamete[C]: 0.918
            gamete[T]: 0.082
        locusID[5]=rs1805009
            gamete[G]: 0.642
            gamete[C]: 0.358

In combination with another user's HaploFile, the two files can be sufficient to generate K* profiles.

Once a user-facing application or server calculates the allele frequency for the user, the HaploFile can be stored on the device, on the Server, or on both. The information in the HaploFile can be compressed to be stored in a more compact (including interpreted or simplified) form to make it easier for subsequent calculations and for sharing with friends. The HaploFile can be stored on removable or portable media, such as a hard disk or flash memory stick, or on an external server such as in a cloud server. What might have been large amounts of noninterpreted sequence data is therefore compressed into meaningful probabilities for efficient transmission, storage, and sharing among users. This solves the network-centric problem of allocating computing capacity efficiently among user devices and servers without moving large amounts of uninformative, repetitive, or "junk" sequence data.

Initiating the Sharing of Haplotypes

In one embodiment, a User receives an alert from the Server, when a triggering event occurs, such as when U2 sends U1's trait info to another, or when U2 sends U3 trait/profile or info to U1. An alert can also be triggered with a user when U1 can sends or offers to send a HaploFile to other users (e.g. a "Share me" button). The alert can prompt a user to send information to other users, such as in the form of a HaploFile.

The individual steps can be performed on different combinations of software and hardware. For example, each user's HaploFile can be stored on the user's device or on the server. When requested, the applications can exchange HaploFiles between the user's devices. To improve user privacy, however, the applications can request that the HaploFiles be stored on a central server so that the exchange of permissions and information occur on the server, rather than being exchanged directly between devices.

Generating Hypothetical Profiles

The profiles are used to generate a probability model for traits, which can be instantiated by the users and optionally shared in whole or in part with other persons directly or through social media and other data channels. Upon receiving a user command, the invention generates a new probabilistic profile of traits for a hypothetical K*. A typical input will involve a random number and probability distribution and output an instance of the trait. A particular output is the sex of K*, which can be based on estimated ratio is 107 males born for every 100 females:

genderProb[M]: 0.519
    genderProb[F]: 0.481

The steps of generating the K* profiles can be performed by the application on one device, by the users' devices, by the server, or some combination of devices and servers.

The K* profile is then displayed to the user or users. The display can be in the form of a text report. The display can also be a visual representation of the K* traits, for example a schematic or avatar having different sex, hair, and eye colors. As each K* profile is generated, it can be displayed one after another, or alongside each other. Re-performing the steps upon receiving a subsequent user command ("Try again" button).

An example of these steps is worked out for the simple wet/dry earwax trait in Example 3.

Multigenerational Models

The invention also provides for gathering trait and sequence information about the user's parents and grandparents to improve the quality of the profile and the probabilistic profile. When building the profile, information about a mother and father's physical traits, group identification, and genetic information, may be added to build a more complete and more accurate profile.

While generating K profiles has been discussed, the invention also provides generating further probabilistic profiles for grandchildren, which can be based on information provided by U1 and U2, and optionally one or more of their parents (i.e. one or more grandparents), if provided.

Sharing Data on Social Media and Professionals

Figure 4:
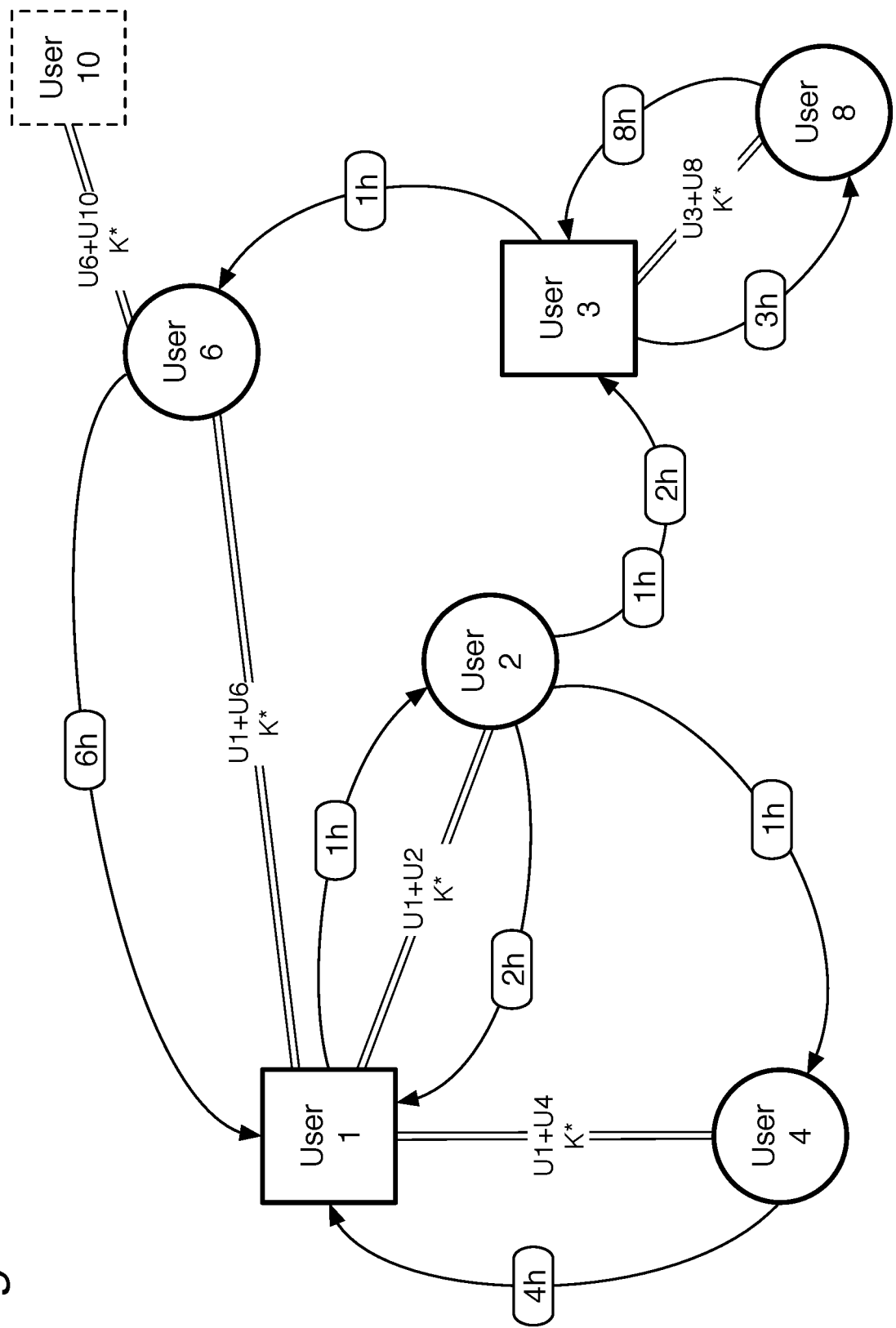
FIG. 4 provides examples of the sharing of profile information by users via social media. The rounded rectangles indicate HaploFiles (discussed below) that can be shared between users. For example, User 1 produces by means of the present invention a shareable packet of genetic information, such as in the form of a HaploFile (rounded rectangle 1h). User 1 then sends a request to User 2 with an invitation to exchange information. The HaploFile can be sent concurrently with the request or afterwards, subject to User 2's approval and permission. User 2 can then respond to User 1 with her own HaploFile, allowing the system to generate one or more K* profiles (double line) based on information provided by or derived from User 1 and User 2.

The invention provides sharing user and hypothetical profiles with other users or professionals, an example of which is depicted in FIG. 4. A user can send a K* profile to other users, or send trait information to other users. The sharing can be directly to another user, or can be shared with multiple users in a defined group of users, or posted more generally to the public via social media. While many users today are accustomed to making personal information available to the public, the invention provides that users may selectively share certain information and types of information to others, such a trait, allelic status and probabilities, and contact information.

The data can also be used and shared with professionals, such as genetic counselors, or that it can itself be a tool used by professionals in their education and transaction with customers and patients. Sharing of health-related information should be compliant with HIPAA and maintain privacy for genetic information. Accordingly, the channels of communication and database should be secure to maintain privacy and preferably be encrypted, such as by private- and public-key cryptography methods. The information can be shared subject to controlled permissions and retrieval of user information can be restricted to limited terms and for limited purposes. For example, allelic information can be stored in a digital medical record file so that users can make this information available securely in a way similar the "Blue Button," which allows patients to access their health information stored online and so it can be shared securely with health care providers. With user consent, information about a user's traits and DNA sequence information can be sent to external database to update its information and improve its accuracy and sample size.

Products Matched to User Correlations

Based on information from user profiles or HaploFile, the user's preferences can be categorized or their likelihood correlated based on a preference-predictive model. Makers or suppliers of food, drink, aromas, music or other sensory products (including services to the user relating to the products) can make their products available in a range of categories that are correlated with different user preferences. Providers of health and fitness services can also individualize their services for users, for example based on cardiac and cancer risk, obesity, and body mass correlations. Alternatively, the maker can custom-make products for individual users or users with similar preferences. Custom beverages include alcoholic drinks like beer, liquors (such as whiskeys or liqueurs) or "hot drinks" such as coffees, which can be provided in custom roasted beans or grounds, and tea blends. Soft drinks include energy drinks and performance drinks. Custom foods can include cheese, sausage, honey, and pasta, BBQ, and hot sauces. For example, milk products can be presented in versions that have more or less lactose. Combination foods, such as salads, cocktails, trail mixes, and spice mixes, can be prepared using ingredients that are selected based on likely user preferences. Foods can also be selected based on user-predicted preferences for foods with a range of distinctive flavors, such as fish, where user preferences can be highly individualized.

Moreover, products can be provided in the form of meals and meal plans that are individualized for trait probabilities for a user. In addition, where two profiles are used to generate a new profile of traits that strongly indicate an aversion or intolerance for a food or ingredient, custom meals can be provided, in the form of foods or meals or ingredients for children or babies for taste sampling and feedback. Other products include health care (such as shampoo individualized for hair types, alopecia, or pattern baldness as in FIG. 6A-6C) or skin care and beauty products that are based on predicted skin types (such as for types for acne, facial aging, pigmentation, psoriasis, and susceptibility to sunburns as in FIGS. 10A-10C). An example of product individualization is toothpaste corresponding to various susceptibilities to dental caries (cavities) correlated with over 60 loci.

Products having fragrances can be customized, such as perfumes, incense, the selection of flowers, and laundry detergent. Products and services can be customized for a wide range of predicted traits, such as those listed in FIG. 10A-10C. While these are provided as examples of increasing one's positive perception to a product, they also serve as concrete opportunities for education and interactions with the complex but real-world effects that genetics plays on individual persons.

In one embodiment, predicted user correlations are shared via social media to other users. In another embodiment, user preferences are communicated to a maker or supplier, who then sends the user information about one or more products or services based on the user's predicted or stated preferences. The products can be sent or the services can be provided one or more times, or according to a periodic subscription or as custom, bespoke versions for the user on demand.

The product to be provided to the user can be selected according to the correlated trait among a plurality of similar products. The product to be provided to the user can be in a form factor, such as quantity, container, or decoration, that reflects the calculated probability of the correlated physical trait. Two or more related products can be provided if the trait is less strongly correlated (such as less than 60, 65, 70, 75, 80, 85, or 90%). The form factor of related products can therefore be distinguished to reflect the degree of predicted correlation with the user. After the user consumes or uses the product, information on the user's preferences, feedback, and survey from the product can then be sent to the maker or supplier to update or fine-tune the model for correlating or predicting user traits or preferences. Such interactions provide individual users with an educational, non-abstract physical presentation of products and services that tangibly illustrate the significance of allelic probabilities, genetic correlations with physical traits such as taste, and how they can be manifested as preferences for one product compared to another similar product.

Methods and Computer Systems

Accordingly, the invention provides a computer-implemented method for a service for genotype-related products in commerce for a plurality of users using a computer system in an electronic environment. The invention provides computer system having one or more processors, at least one storage medium storing instructions, and operatively coupled to the one or more processors that upon executing instructions from the at least one storage medium, are configured to perform the method of the invention. In one embodiment, the computer system can have (1) a local device for
   (a) receiving trait information from a user;
   (b) receiving the user's selection of a second person;
   (c) receiving a command by the user to generate a new profile; and
   (d) displaying new K* trait information to the user;
(2) an internet connection to retrieve a profile of the second person from a remote database; and
(3) a computer server that is coupled to the device and the internet connection, and that is programmed to
   (a) generate a first profile of allelic probabilities from a user;
   (b) generate a second profile of corresponding allelic probabilities;
   (c) generate a probability for each trait from the first and second profiles;
   (d) upon receiving a user command, generate a new probabilistic profile of traits;
   (e) display the new K* profile of traits to the user; and re-perform steps (d) and (e) upon receiving a subsequent user command.

The system can have a camera for taking an image of the user. The system can also have an image-processing unit for detecting a trait of the user. Moreover, the system can have a device for monitoring the physiology of the user, or the capability of determining the location of the user.

The invention also provides a computer program product, stored on a non-transitory computer-readable storage medium, having instructions recorded thereon, that, when executed by one or more processors, cause the one or more processors to perform the methods of the invention.

EXAMPLES

Example 1: User Profile

Information about each U or K has a profile of information about the U or K and his or her traits. There are many ways to design a profile, but here is an example of a profile.

```
typedef enum {FREND, FRIEND_OF_FRIEND, EX, FRENEMY, STRANGER, CELEBRITY}
propinquityTyp;
typedef struct {
    int userID;
    propinquityTyp propinquity;} friendTyp;
typedef enum {A, C, G, T, dU, 5mC, del, ins} baseTyp;
typedef enum {DOMINANT, RECESSIVE, X-DOMINANT, X-RECESSIVE, MULTIFACTORIAL,
MITOCHONDRIAL, MIXED, QUANTITATIVE_TRAIT_LOCUS, CIS_ACTING}
inheritanceModeTyp;
typedef struct { /*each base has a % likelihood*/
    baseTyp nucleotide;
    inheritanceModeTyp inheritanceMode; /*need rule for each base case*/
    float baseProb;} alleleTyp;
typedef enum { SELF_PROVIDED, RETRIEVED_FROM_PROFILE, DESCRIBED_BY_ANOTHER,
RETRIEVED_FROM DATABASE, OBSERVED_BY_DEVICE} provenanceTyp;
typedef enum {GENERATED_FROM_HAPLOTYPE_INFO,
GENERATED_RANDOMLY_FROM_KNOWN_ETHNIC_GROUP; PURELY_RANDOM} confidenceTyp;
typedef struct {
    char locusID[30]; /*the SNP identifier, like "rs17822931"*/
    char locusName[20]; /*locus nickname, like "ABCC11 nuc. pos. 538"*/
    alleleTyp somatic1[8]; /*for each of the 4 bases, plus 4 extra*/
    alleleTyp somatic2[8];
    alleleTyp gamete[8]; /*the main info to be exchanged via social media*/
    char dominanceComment[200] ;
    provenanceTyp genoProvenance;
    confidenceTyp genoConfidence;} locusTyp;
typedef struct {
    int traitID; /*numerical identifier*/
    char traitNickname[30]; /*like "wet or dry earwax*/
    char phenoDesc[30]; /*like "ABCC11wet (G180)" or "ABCC11dry (G180R)"*/
    provenanceTyp traitProvenance;
    confidenceTyp traitConfidence;
    locusTyp locus[100];} phenotypeTyp; /*a trait can have many, many
        associated loci*/
typedef struct {
    int userID;
    char username[20];
    char gender[1];
    char groupID[30];
    friendTyp friend[1000];
    phenotypeTyp trait[2000];} ProfileTyp;
ProfileTyp user[10000];
int main(void) { return 0;}
```

Example 2: Database

An external database can be updated as new information about genetic variations and health information becomes available. An example of a database can have fields such as:
user information
user contact
lookup tables for each
  scientific info (curated)
    Medline, article references (with confidence ratings)
    NCBI references; databases such as ClinVar and ClinGen.
    nucleotide position(s), e.g. rs17822931
    disease correlations
Ph.D. or M.D.-level professionals to curate the database and its summaries
  trait
    trait prevalence info for ethnic groups
  haplotype
    haplotype prevalence info for ethnic groups
    rule for converting two known haplotypes to a predicted trait
    rule for converting a known trait to % chance of each possible haplotype
    rule for converting % chances of 2 (or 4 for grandchildren) haplotypes into % chance of each trait value Example 3: Mendelian, Simple Trait—Earwax An example of a simple trait is wet versus dry earwax types. The gene ABCC11 encodes a protein that transports molecules across membranes, and is involved in several metabolic processes, including involving bile acids, conjugated steroids, and cyclic nucleotides. While earwax type is the most easily observed trait resulting from variations in this gene, the gene is associated with other traits such as body odor.

| physical trait information | wet earwax | dry earwax |
|---|---|---|
| ABCC11 ATP-binding cassette, sub-family C, member 11 | G180 | G180R |
| SNP rs17822931 | 538G ("b") | 538G > A ("a") |
| Possible alleles | a/b, b/b, b/a | a/a |

If the genotype of User 1 is known, for example from self-reporting by User 1 or by receiving sequencing information about User 1, then the HaploFile for User 1 can be relatively straightforward. If User 1 has two copies (homozygous) of the wet earwax allele, then the HaploFile can be
  userID: 14159
  gender: M
  locus[470] (earwax type)
    locusID[1]: rs17822931
      gamete[G]: 1.000

If User 1 is known to have one copy of the wet earwax allele and one copy of the dry earwax allele, then the HaploFile can be
   userID: 14159
   gender: M
   locus[470] (earwax type)
      locusID[1]: rs17822931
         gamete[G]: 0.500
         gamete[A]: 0.500
because in a potential pairing with another user, User 1 has a 50% chance of contributing a wet ear wax allele (base G at SNP rs17822931) and a 50% chance of contributing a dry ear wax allele (base A at SNP rs17822931).

If User 1 does not know his genotype, then he can report the physical trait of his earwax type, whether wet or dry. If he self-reports a wet earwax trait, then the application sends a query to the database. The database returns a set of probabilities to the application for each haplotype based on the reported trait. If no other information is available, then the HaploFile can be based on information aggregated for all populations that have been genotyped for this trait.
   userID: 14159
   gender: M
   locus[470] (earwax type)
      locusID[1]: rs17822931
         gamete[G]: 0.731
         gamete[A]: 0.269

If User 1 self-reports belonging to a group, the quality of the haplotype prediction is likely to be improved by reference to information on the curated database on available genetic data for populations.

| Probabilities for alleles by Group | P (538G) | P (538G > A) |
|---|---|---|
| African-Americans (n = 182) | 100.0% | 0.0% |
| European-Americans (n = 164) | 89.0% | 11.0% |
| Danes (n = 102) | 87.2% | 12.8% |
| Irish (n = 230) | 84.8% | 15.2% |
| Germans (n = 132) | 83.8% | 16.2% |
| French (n = 24) | 79.2% | 20.8% |
| Russians (n = 96) | 69.8% | 30.2% |
| Filipino (n = 96) | 53.1% | 46.9% |
| Vietnamese (n = 306) | 26.8% | 73.2% |
| Japanese (n = 188) | 12.2% | 87.8% |
| Han Chinese (n = 238) | 3.8% | 96.2% |
| Koreans (n = 198) | 0.0% | 100.0% |

For example, if User 1 reports wet earwax and self-identifies with the European American group, the application on his device can transmit this information through the internet to the server hosting the curated database. The server can then return information to the application to generate a HaploFile for User 1:
   userID: 14159
   gender: M
   locus[470] (earwax type)
      locusID[1]: rs17822931
         gamete[G]: 0.890
         gamete[A]: 0.110

If User 2 self-identifies as Vietnamese, the application on her device can query the database to generate a HaploFile for User 2:
   userID: 27182
   gender: F
   locus[470] (earwax type)
      locusID[1]: rs17822931
         gamete[G]: 0.268
         gamete[A]: 0.732

Under appropriate permissions, if User 1 and User 2 agree to exchange haplotype information, the apps on their devices can exchange their HaploFiles to generate a probabilistic allele model for a hypothetical K01*.

|  | U1: G538 gamete (90.1%) | U1: G538A gamete (9.9%) |
|---|---|---|
| U2: G538 gamete (0%) | 0% (homozygote) | 0% (heterozygote) |
| U2: G538A gamete (100%) | 90.1% (heterozygote) | 9.9% (homozygote) |

An additional query may be needed to the curated database for information on the mode of inheritance, whether autosomal dominant, autosomal recessive, X-linked dominant, X-linked recessive, multifactorial, and mitochondrial inheritance, and so on. Based on this information the application or the server can generate K* profiles:
   Allele-wise, the child will have
   0.0% chance of being homozygous G538
   90.1% chance of being heterozygous, and
   9.9% chance of being homozygous G538A
from which probabilities can be predicted for the child's traits:
   Child will have 90.1% chance of wet trait
   Child will have 9.9% chance of dry trait Upon a user request, an instance of a K* profile can be generated with input from a random number generator, for example K01* wet trait. A new K* profile can be generated, such as K02* wet trait, K03* wet trait, K04* wet trait, K05* wet trait, K06* wet trait, K07* wet trait, K08* wet trait, K09* dry trait, K10* wet trait, K11* wet trait, K12* wet trait, K13* wet trait, etc.

Example 4: Rh Blood Group

Another somewhat more complicated trait is the Rh blood group.

| physical trait information | D antigen present | D antigen absent |
|---|---|---|
| RHCE Rhesus blood group, CcEe antigens/Rhesus blood group, D antigen | | |
| SNP | multilocus | multilocus |
| Possible alleles | D | d |
| Probabilities for alleles by Group | D allele | d allele |
| Basque | 40% | 60% |
| other European | 60% | 40% |
| African American | 74% | 26% |
| Native American | 90% | 10% |
| African | 97% | 3% |
| Asian | 99% | 1% |

Example 5: ABO Blood Group

The system of the invention can be localized for traits that are of regional interest. For example ABO blood types are popularly believed in Japan and Korea to correlate with certain personality types. Regardless of the scientific merits of such correlations, a user's blood group presents an opportunity to educate the user about the biological basis for ABO blood groups and their inheritance.

A user's ABO blood type is determined by a set of loci on chromosome 9. The A allele results in expression of a glycosyltransferase that adds an α-1,3-N-acetylgalactosamine residue to a red blood cell surface antigen (the H antigen), resulting in an A antigen on the cells surface. With a B allele, the glycosyltransferase transfers an α-D-galactose instead, resulting in the expression of a B surface antigen. When a person has one copy of the A allele and one copy of the B allele, both A and B antigens are present, resulting in an AB blood type. In the case of an O allele, the glycosyltransferase is inactive due to a frameshift mutation, so the original H antigen is present (0 blood type).

|  | type O blood | type A blood | type B blood | type AB blood |
|---|---|---|---|---|
| physical trait information | no A or B antigen present | A antigen present) | B antigen present) | A and B antigens present |
|  | inactive glycosyl transferase | active alpha 1-3-N-acetyl galactosaminyl transferase (TA) | active alpha 1-3-galactosyl transferase (TB) | active TA and TB |
| rs8176719 | del | G or del | del or G | G |
| rs8176746 | C | C | A/A or A/C | A/C |
| rs8176747 | G | G | C/C or C/G | C/G |

Self-reporting of the user's blood type should be enough to determine the user's diploid genotype in the case of O and AB, and the allelic model is straightforward:

```
if trait [951] (ABO blood group) = "O"
locus[951]
        locusID[1] (O locus) : rs8176719
                gamete[del] := 1.000
if trait [951] (ABO blood group) = "AB"
locus[ 951]
        locusID[1] (O locus) : rs8176719
                gamete[G] := 1.000
        locusID[2] (A locus) : rs8176746
                gamete[A] : 0.500
                gamete[C] : 0.500
```

-continued

```
        locusID[3] (B locus) : rs8176747
                gamete[C] : 0.500
                gamete[G] : 0.500
```

However, users with self-reported type A blood can have a homozygous A/A or heterozygous A/O (or O/A) genotype. Similarly, a type B user can be B/B, B/O, or O/B. If genotypic or sequencing information for the user (or the user's parents) is available, the exact genotype can be determined. Absent such supplemental information, a probabilistic model can be generated for A and B blood group users based on the most recent data for the user's self-reported group (if available) or for the sampled population as a whole. For example,

| Probabilities for alleles by Group | rs8176746 %A:%C |
|---|---|
| Japanese n = 56 | 11%:89% |
| Korean n = 106 | 18%:82% |
| French n = 58 | 95%:5% |
| Russian n = 50 | 12%:88% |

As discussed before, if trait information is available for the user's parents, the quality of the prediction can often be improved.

Example 6: Complex Trait—Red Hair Color

The many shades and color gradients of hair are a complex trait governed by several genes and SNPs within those genes. SNPs can have varying degrees of influence upon a trait, and some SNPs may have a strong or even dominant effect. Red hair is a genetic trait that is sometimes observed by family members to be inherited unpredictably and to sometimes skip a generation. It is currently understood to result from having two copies of any of several recessive alleles at the MCR1 gene on chromosome 16. The altered version of the MCR1 gene product decreases production of the dark pigment eumelanin and allows the reddish pigment pheomelanin that is present in hair to become more prominently visible. Among the MCR1 loci that can result in the red-headed trait, some have clinically relevance: rs1805006 is associated with melanoma, and rs1805007 has been linked in female patients to being more responsive to anesthetics pentazocine, nalbuphine, and butorphanol.

| physical trait information | not red hair | | | | red hair | |
|---|---|---|---|---|---|---|
| MC1R alpha melanocyte stimulating hormone receptor | dominant | | | | recessive | |
| rs1805005 | V60 G | | | | V60L G > T | |
| rs1805006 | D84 C | | | | D84E C > A | |
| rs2228479 | V92 G | | | | V92M G > A | |
| rs1805007 | R151 C | | | | R151C C > T | |
| rs1805009 | D294 G | | | | D294H G > C | |
| Probabilities by Group | rs 1805005 G, G>T | | rs 1805006 C, C > A | rs 2228479 G, G>A | rs 1805007 C, C > T | rs 1805009 G, G > C |
| Danes n = 102 | 93% | 7% | 98% 2% | 95% 5% | 89% 11% | 100% 0% |
| Finns n = 72 | 94% | 6% | 100% 0% | 94% 6% | 96% 4% | 100% 0% |
| Irish n = 228 | 82% | 18% | 96% 4% | 88% 12% | 92% 8% | 95% 5% |
| Poles n = 770 | 92% | 8% | 100% 0% | 99% 1% | 89% 11% | 99% 1% |
| Russians n = 96 | 95% | 5% | 100% 0% | 89% 12% | 98% 2% | 100% 0% |

Other loci affecting hair color are shown in FIGS. 6A, 6B, and 6C. The Val92Met variant at rs2228479 was previously identified only in Neanderthal specimens, and was believed to have resulted in red hair that evolved independently from modern humans. As shown above, however, later studies found this mutation occurring in modern populations including East Asians and especially among Taiwanese aborigines, who, on linguistic evidence, are thought to have settled much of Austronesia. This provides another opportunity to discuss how the availability of new information affects the mathematics of allelic probabilities and in turn shape perceptions of our identity as a species.

Example 7: Complex Trait—Eye Color

A single genetic mutation of the HERC2 gene is believed to interact with the OCA2 gene promoter, reducing expression of OCA2 with subsequent reduction in melanin production, leading to blue eyes instead of brown. Other loci affecting eye color are shown in FIG. 7.

| physical trait information | brown eyed | blue eyed |
|---|---|---|
| HERC2 reduced expression of OCA2 | dominant | recessive |
| rs12913832 | A | A > G |
| rs1129038 | C | C > T |

| Probabilities by Group | brown | brown | brown | blue |
|---|---|---|---|---|
| rs12913832: | A | G | A | G |
| rs1129038: | C | C | T | T |
| Danes n = 102 | 12.7% | 0.0% | 0.0% | 87.3% |
| Finns n = 68 | 16.7% | 2.9% | 0.0% | 8.1% |
| Irish n = 228 | 19.7% | 1.3% | 0.4% | 78.5% |
| Russians n = 96 | 16.7% | 0.0% | 1.0% | 82.3% |
| Druze n = 204 | 63.2% | 0.0% | 0.5% | 36.3% |

In addition, SNP rs1800407 has been associated with green/hazel eyes.

| physical trait information | brown eyed | green/hazel eyed |
|---|---|---|
| rs1800407 | dominant C Arg | recessive C > T Arg > Gln |

| Probabilities by Group | C | T |
|---|---|---|
| Danes n = 102 | 94.7% | 2.9% |
| Finns n = 68 | 97.1% | 8.3% |
| Irish n = 228 | 89.0% | 11.0% |
| Russians n = 96 | 99.0% | 1.0% |
| Druze n = 204 | 96.6% | 3.4% |

Example 8: Mixture of Trait Types—Beverage Correlation: Coffee

Eight roasts of coffee are prepared and blended for the following user taste preference profiles:

| TAS2R38 | A49 | A49B | A49B | A49 | A49B | A49B | A49 | A49 |
|---|---|---|---|---|---|---|---|---|
| T1R variant | sweet | sweet | | | sweet | sweet | | |
| AHR variant | fast | slow | fast | slow | fast | slow | fast | slow |
| chronotype | morn | eve | morn | eve | morn | eve | morn | eve |
| roast ID | 36 | 8 | 9 | 13 | 1 | 44 | 46 | 68 |

-continued

| TAS2R38 | A49 | A49B | A49B | A49 | A49B | A49B | A49 | A49 |
|---|---|---|---|---|---|---|---|---|
| roast | dark | dark | dark | dark | light | light | light | light |
| rel. acid | high | high | low | low | high | high | low | low |
| rel. caffeine | high | low | high | low | high | low | high | low |

The roasts are brewed at weak, medium, and strong strengths for sampling by users having alleles associated with morning persons. The initial correlation model is refined based on feedback from the users.

Many other genetic loci that may affect the perception of coffee and the physiological effects of caffeine, and ultimately influence a user's preferences are shown in FIGS. 8A and 8B.

Example 9: Sensory Traits—Beverage: Beer Correlations

Eight categories of craft beers are selected according to the taste profiles and evaluated by users on a separate day than Example 8.

| TAS2R38 | A49 | A49 | A49B | A49 | A49B | A49 | A49B | A49B |
|---|---|---|---|---|---|---|---|---|
| T1R variant | sweet | | sweet | | sweet | | | sweet |
| TAS2R16 | N172 | N172 | N172 | N172 | K172 | K172 | K172 | K172 |
| beer ID | B, B1 | L, P | D, D2 | E | F | G | H | IPA |
| rel. alcohol | high | low | high | low | high | high | low | low |
| SRM color | light | light | dark | dark | light | dark | light | dark |
| IBU | low | low | high | low | high | low | high | high |

Where a user's probabilistic profile for a physical trait does not strongly correlate with a particular product (such as beer ID B compared to F), then both B and F can be provided for user feedback. Optionally, a stronger correlation with a trait (such as TAS2R38 allele A49) can be indicated by providing ID B in a different quantity or presentation relative to ID F to illustrate the difference in predicted probabilities. Feedback from the individual user or from multiple users is used to improve the correlation model. In addition to FIGS. 8A and 8B, FIGS. 9A-9D list many other genetic loci that may relate to a user's experience and preference for certain foods and drinks.

Skilled artisans will appreciate that additional embodiments are within the scope of the invention. The invention is defined only by the following claims, and limitations from the specification or its examples should not be imported into the claims.

The invention claimed is:

1. A method comprising
   (a) collecting allelic information about a user;
   (b) for each user, calculating probabilities for alleles associated with a trait by reference to an allelic database;
   (c) for each user, generating a profile of probability distributions for each trait; and providing the user with information about a non-custom beer or beer subscription that is correlated with a trait in the user's profile.

2. The method of claim 1, further comprising providing the user with the non-customized beer or beer subscription.

3. The method of claim 1, wherein
   step (a) further comprises collecting allelic information about a second user;

step (b) further comprises calculating probabilities for the second user for alleles associated with a trait by reference to an allelic database; and the method further comprises the steps of (d) in response to a user command, generating a first probabilistic profile of traits for hypothetical progeny, based on the first and second profiles;

(e) in response to a subsequent user command, generating a subsequent probabilistic profile of traits for hypothetical progeny, based on the first and second profiles; and (f) displaying the profile of progeny traits from steps (d) or (e) to a user.

4. The method of claim 3, wherein step (f) is performed by displaying a visual depiction of the traits.

5. The method of claim 3, wherein the profile of progeny traits in step (f) is displayed to another user via social media.

6. A computer-implemented method for a non-customized beer or beer subscription in commerce using a computer system in an electronic environment, comprising the steps of claim 1, and further comprising sending information from the user's profile via an internet connection to a remote computer server.

7. The method of claim 6, further comprising providing the user with the non-customized beer or beer subscription.

8. A computer system comprising
one or more processors; and
at least one storage medium storing instructions that are operatively coupled to the one or more processors and that are configured to perform the method of claim 1 upon executing instructions from the storage medium.

9. A computer system comprising
(1) a local device for
  (a) receiving trait information from a user;
  (b) receiving a command by the user to generate a profile; and
  (c) displaying trait information to the user;
(2) an internet connection to retrieve a profile of the person from a remote database; and
(3) a computer server that is coupled to the device and the internet connection, and that is programmed to perform the method of claim 1.

10. The computer system of claim 9, wherein step (c) further comprises providing the user with the non-customized beer or beer subscription.

11. An application for a mobile device stored on a non-transitory computer-readable storage medium having instructions recorded thereon, that, when executed by one or more processors, cause the one or more processors to perform the method of claim 1.

12. The application of claim 11, further comprising providing the user with the non-customized beer or beer subscription.

13. The application of claim 11, wherein
step (a) further comprises collecting allelic information about a second user;
step (b) further comprises calculating probabilities for the second user for alleles associated with a trait by reference to an allelic database; and
the method further comprises the steps of
(d) in response to a user command, generating a first probabilistic profile of traits for hypothetical progeny, based on the first and second profiles;
(e) in response to a subsequent user command, generating a subsequent probabilistic profile of traits for hypothetical progeny, based on the first and second profiles; and
(f) displaying the profile of progeny traits from steps (d) or (e) to a user.

14. The method of claim 13, wherein step (f) is performed by displaying a visual depiction of the traits.

15. The method of claim 13, wherein the profile of progeny traits in step (f) is displayed to another user via social media.

16. A method comprising
(a) collecting allelic information about a user;
(b) for each user, calculating probabilities for alleles associated with a trait by reference to an allelic database;
(c) for each user, generating a profile of probability distributions for each trait; and providing the user with information about a non-custom product or product subscription that is correlated with a trait in the user's profile, wherein the product is selected from the group consisting of coffee, tea, and a hot sauce.

17. The method of claim 16, further comprising providing the user with the non-customized product or product subscription.

18. The method of claim 16, wherein
step (a) further comprises collecting allelic information about a second user;
step (b) further comprises calculating probabilities for the second user for alleles associated with a trait by reference to an allelic database; and
the method further comprises the steps of
(d) in response to a user command, generating a first probabilistic profile of traits for hypothetical progeny, based on the first and second profiles;
(e) in response to a subsequent user command, generating a subsequent probabilistic profile of traits for hypothetical progeny, based on the first and second profiles; and
(f) displaying the profile of progeny traits from steps (d) or (e) to a user.

19. The method of claim 18, wherein step (f) is performed by displaying a visual depiction of the traits.

20. The method of claim 18, wherein the profile of progeny traits in step (f) is displayed to another user via social media.

21. A computer-implemented method for a non-customized product or product subscription in commerce using a computer system in an electronic environment, comprising the steps of claim 16, and further comprising sending information from the user's profile via an internet connection to a remote computer server.

22. The method of claim 21, further comprising providing the user with the non-customized product or product subscription.

23. A computer system comprising one or more processors; and
at least one storage medium storing instructions that are operatively coupled to the one or more processors and that are configured to perform the method of claim 16 upon executing instructions from the storage medium.

24. A computer system comprising
(1) a local device for
  (a) receiving trait information from a user;
  (b) receiving a command by the user to generate a profile; and
  (c) displaying trait information to the user;

(2) an internet connection to retrieve a profile of the person from a remote database; and
(3) a computer server that is coupled to the device and the internet connection, and that is programmed to perform the method of claim 16.

25. The computer system of claim 24, wherein step (c) further comprises providing the user with the non-customized product or product subscription.

26. An application for a mobile device stored on a non-transitory computer-readable storage medium having instructions recorded thereon, that, when executed by one or more processors, cause the one or more processors to perform the method of claim 16.

27. The application of claim 26, further comprising providing the user with the non-customized product or product subscription.

28. The application of claim 26, wherein
step (a) further comprises collecting allelic information about a second user;
step (b) further comprises calculating probabilities for the second user for alleles associated with a trait by reference to an allelic database; and
the method further comprises the steps of
(d) in response to a user command, generating a first probabilistic profile of traits for hypothetical progeny, based on the first and second profiles;
(e) in response to a subsequent user command, generating a subsequent probabilistic profile of traits for hypothetical progeny, based on the first and second profiles; and
(f) displaying the profile of progeny traits from steps (d) or (e) to a user.

29. The method of claim 28, wherein step (f) is performed by displaying a visual depiction of the traits.

30. The method of claim 28, wherein the profile of progeny traits in step (f) is displayed to another user via social media.

* * * * *